US011968099B2

(12) United States Patent
Mannweiler et al.

(10) Patent No.: US 11,968,099 B2
(45) Date of Patent: Apr. 23, 2024

(54) REALIZATION OF SERVICE LEVEL AGREEMENTS IN NETWORK SLICE SCENARIOS JOINING MULTIPLE NETWORK CAPABILITIES

(71) Applicant: NOKIA SOLUTIONS AND NETWORKS OY, Espoo (FI)

(72) Inventors: Christian Mannweiler, Munich (DE); Jürgen Goerge, Neuried (DE); Konstantinos Samdanis, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/634,017

(22) PCT Filed: Aug. 13, 2019

(86) PCT No.: PCT/EP2019/071719
§ 371 (c)(1),
(2) Date: Feb. 9, 2022

(87) PCT Pub. No.: WO2021/028027
PCT Pub. Date: Feb. 18, 2021

(65) Prior Publication Data
US 2022/0294709 A1    Sep. 15, 2022

(51) Int. Cl.
*H04L 41/5019* (2022.01)
*H04L 41/50* (2022.01)
*H04L 41/5051* (2022.01)

(52) U.S. Cl.
CPC ...... *H04L 41/5019* (2013.01); *H04L 41/5032* (2013.01); *H04L 41/5051* (2013.01); *H04L 41/5058* (2013.01)

(58) Field of Classification Search
None
See application file for complete search history.

(56) References Cited

U.S. PATENT DOCUMENTS 8,204,992 B2 * 6/2012 Arora ............... H04L 67/107
   713/168
8,370,529 B1 * 2/2013 Hansen ............ H04L 63/0209
   726/22

(Continued)

FOREIGN PATENT DOCUMENTS

WO    WO 2019/081005 A1    5/2019

OTHER PUBLICATIONS

International Search Report and Written Opinion dated Feb. 20, 2020 corresponding to International Patent Application No. PCT/EP2019/071719.

(Continued)

*Primary Examiner* — Ranodhi Serrao
(74) *Attorney, Agent, or Firm* — Barta Jones, PLLC

(57) ABSTRACT

There are provided measures for realization of service level agreements in network slice scenarios joining multiple network capabilities. Such measures exemplarily comprise, as a slice management entity, receiving a network resource combination request, transmitting a request for at least one area base unit fulfilling, receiving, from said area base units repository, area base units fulfilling said at least one predetermined criterion out of stored area base units, generating at least one area base units join, selecting at least one selected area base units join of said at least one area base units join such that a combination of join geographical areas of said at least one selected area base units join covers said slice geographical area, and combining said at least one selected area base units join as a network resource combination.

20 Claims, 18 Drawing Sheets

(56) References Cited

U.S. PATENT DOCUMENTS

| | | | |
|---|---|---|---|
| 9,906,962 B2* | 2/2018 | Markwart | H04W 64/00 |
| 10,411,964 B2* | 9/2019 | Zhang | H04L 41/50 |
| 10,582,393 B2* | 3/2020 | Deviprasad | H04L 41/5051 |
| 10,673,751 B2* | 6/2020 | Dowlatkhah | H04L 45/64 |
| 10,749,796 B2* | 8/2020 | Dowlatkhah | H04L 41/40 |
| 2013/0023295 A1* | 1/2013 | Kasslin | H04W 48/14 |
| | | | 455/501 |
| 2018/0077023 A1* | 3/2018 | Zhang | H04L 41/0896 |
| 2018/0132138 A1* | 5/2018 | Senarath | H04L 41/0813 |
| 2018/0139106 A1* | 5/2018 | Senarath | H04L 67/51 |
| 2018/0316564 A1* | 11/2018 | Senarath | H04L 41/5006 |
| 2018/0316779 A1* | 11/2018 | Dowlatkhah | H04W 24/02 |
| 2018/0317133 A1* | 11/2018 | Sciancalepore | H04W 16/02 |
| 2019/0021010 A1* | 1/2019 | Senarath | H04L 41/5051 |
| 2019/0174322 A1* | 6/2019 | Deviprasad | H04L 43/0817 |
| 2020/0045548 A1* | 2/2020 | Dowlatkhah | H04N 21/26216 |
| 2020/0154280 A1* | 5/2020 | Deviprasad | H04L 41/0806 |
| 2020/0259744 A1* | 8/2020 | Dowlatkhah | H04W 24/02 |
| 2020/0336872 A1* | 10/2020 | Basu Mallick | H04W 4/021 |

OTHER PUBLICATIONS

Nokia et al., "Update Solution Set to fix Network Slice modeling issue," 3GPP Draft; S5-192328, 3GPP TSG-SA5 Meeting #124, Taipei, Taiwan, Mar. 14, 2019, XP051688535.

Huawei, "pCR 28.532 update on network slice information model," 3GPP Draft; S5-184079, 3GPP TSG SA WG5 (Telecom Management) Meeting #119 Ad-hoc, Stockholm, Sweden, Jun. 18, 2018, XP051543670.

Nokia et al., "TD GST QoS to 3GPP NRM mapping," 3GPP Draft; S5-195430, 3GPP TSG-SA5 Meeting #126, Bruges, Belgium, Aug. 9, 2019, XP051757723.

T-Mobile, "New Key Issue: Geographic 5GC slice instances for IMS," 3GPP Draft; S2-185233, SA WG2 Meeting #127bis, Newport Beach, USA, May 27, 2018, XP051448732.

3GPP TS 22.261 V16.8.0 (Jun. 2019), Technical Specification, 3rd Generation Partnership Project; Technical Specification Group Services and System Aspects; Service requirements for the 5G system; Stage 1 (Release 16), Jun. 2019.

3GPP TS 23.032 V15.1.0 (Sep. 2018), Technical Specification, 3rd Generation Partnership Project; Technical Specification Group Services and System Aspects; Universal Georgraphical Area Description (GAD) (Release 15), Sep. 2018.

3GPP TS 28.541 V16.1.0 (Jun. 2019), Technical Specification, 3rd Generation Partnership Project; Technical Specification Group Services and System Aspects; management and orchestration; 5G Network Resource Model (NRM); Stage 2 and stage 3 (Release 16), Jun. 2019.

GsSMA, "From Vertical Industry Requirements to Network Slice Characteristics," 5G Network Slicing Report, Aug. 2018, https://www.gsma.com/futurenetworks/wp-content/uploads/2018/09/5G-Network-Slicing-Report-From-Vertical-Industry-Requirements-to-Network-Slice-Characteristics.pdf.

TM Forum GB922, "Information Framework (SID)", Rel .18.5, 2018.

* cited by examiner

ABU Repository

| ABU | RAT | Features | Performance Capabilities | Policy | Geo-Coordinates | Joint Features (Overlapping ABUs) | Joint Policy (Overlapping ABUs) |
|---|---|---|---|---|---|---|---|
| ABU-1 | 5G | New Radio | Bw, Del, Resil, etc. | Prioritize Service type X | Polygon (x,y) | - | ABU-2: H-off high speed users to LTE |
| ABU-2 | WiFi | - | $Bw'$, $Del'$, $Resil'$, etc. | - | Polygon $(x',y')$ | ABU-3: Dual Connectivity | ABU-3: Assign high Bw service |
| ABU-3 | LTE | Carrier Aggregation, CoMP | $Bw^*$, $Del^*$, $Resil^*$, etc. | Use CoMP for stationary users | Polygon $(x^*,y^*)$ | ABU-2: Dual Connectivity | ABU-2: Offload traffic type-X |
| ABU-4 | LTE | Carrier Aggregation | $Bw^o$, $Del^o$, $Resil^o$, etc. | Limit FTP Rate to X, etc. | Polygon $(x^o,y^o)$ | ABU-5: Hybrid Access ABU-7: Carrier Aggregation | ABU-5: Fixed 1st ABU-7: Allocate high Bw Services |
| ABU-5 | Fixed Access | - | $Bw''$, $Del''$, $Resil''$, etc. | Prioritize HD Video | Polygon $(x'',y'')$ | ABU-4: Hybrid Access | ABU-4: Fixed 1st |
| ABU-6 | Fixed Access | - | $Bw'''$, $Del'''$, $Resil'''$, etc. | Time access for X IoT devices | Polygon $(x''',y''')$ | - | - |
| ABU-7 | mmWave | Beamforming | $Bw^{\varrho}$, $Del^{\varrho}$, $Resil^{\varrho}$, etc. | Prioritize high speed users | Polygon $(x^{\varrho},y^{\varrho})$ | ABU-4: Carrier Aggregation | ABU-4: Beamforming for non-stationary users |

Fig. 12

Forming Joins of ABUs

| Sub-GA | ABU | RAT | Joint-Radio Features | Geo-Coordinates | Policy |
|---|---|---|---|---|---|
| Join-1 | ABU-1 | 5G | New Radio | Polygon (x,y) | Hoff high-speed users to LTE |
| Join-2 | ABU-2, ABU-3 | LTE, WiFi | Dual Connectivity | Polygon (x',y') | Offload traffic type-X |
| Join-3 | ABU-4, ABU-5 | LTE, Fixed Access | Hybrid Access | Polygon (x*,y*) | Fixed 1rst |
| Join-4 | ABU-4, ABU-7 | LTE, mmWave | Carrier Aggregation | Polygon (x°,y°) | Beamforming for non-stationary users |

Fig. 13

REALIZATION OF SERVICE LEVEL AGREEMENTS IN NETWORK SLICE SCENARIOS JOINING MULTIPLE NETWORK CAPABILITIES

FIELD

The present invention relates to realization of service level agreements in network slice scenarios joining multiple network capabilities. More specifically, the present invention exemplarily relates to measures (including methods, apparatuses and computer program products) for realizing realization of and compliance with service level agreements in network slice scenarios joining multiple network capabilities.

BACKGROUND

The present specification generally relates to network slices and the integration of realization thereof in scenarios in which the underlying physical resources do not necessarily provide constant and/or similar characteristics.

Network Slices provide an end-to-end self-contained logical network instance customized to accommodate business requirements and service-level agreements (SLAs). This means that a single slice instance can span, among others, multiple radio, network, and/or administrative network domains.

For describing the network slice on this level of abstraction, $3^{rd}$ Generation Partnership Project (3GPP) has defined Information Object Classes (IOCs) NetworkSlice and NetworkSliceSubnet that contain as attributes the "DataTypes" ServiceProfile and SliceProfile, respectively.

The focus of such IOCs is on the 3GPP networks without providing any means to include other non-3GPP network technologies, which can complement 3GPP network coverage and service capabilities. In order to describe the coverage area of a slice and slice subnet instance, respectively, both profiles contain the attribute coverageAreaTAList, the definition of which is specified in the table below.

| coverageAreaTAList | An attribute specifies a list of <TrackingArea> where the NSI can be selected. | type: <<dataType>><br>multiplicity: 1..*<br>isOrdered: N/A<br>isUnique: N/A<br>defaultValue: None<br>allowedValues: N/A<br>isNullable: False |
|---|---|---|

This definition can be interpreted as follows:

In an abstract definition, a slice consists of one or more objects that expose to the (communication) service management layer the notion of coverage area by using the 3GPP concept of Tracking Areas. A Tracking Area (TA) is comprised of groups of cells defined by the 3GPP Radio Access Network (RAN) and is mainly used for paging. From the RAN perspective, a specific Single Network Slice Selection Assistance Information (S-NSSAI) needs to be supported by all cells contained in the TA. From core network (CN) perspective, an S-NSSAI even needs to be supported in all cells of a Registration Area (RA). The notion of a TA and coverage including the description of its related capabilities is only relevant to the 3GPP radio network. It does not include non-3GPP networks, such as WiFi or millimeter wave (mmWave). The current TA based approach is further limited to any emerging non-3GPP radio technology. Non-3GPP (access) networks, e.g., WiFi (IEEE 802.11) access, are represented in the 3GPP network as a single TA without providing any notion of distinction in terms of coverage and service and/or resource capabilities with respect to each Radio Access Technology (RAT).

Currently, the requirements for a slice are described by a set of parameters in either ServiceProfile/SliceProfile (3GPP Technical Specification (TS) 28.541) and Network Slice Template (NEST, "GSMA "Generic Network Slice Template", https://www.gsma.com/futurenetworks/wp-content/uploads/2018/09/5G-Network-Slicing-Report-From-Vertical-Industry-Requirements-to-Network-Slice-Characteristics.pdf"), respectively. E.g., the slice is characterized to support a required number of users, a specific up/downlink throughput per slice or per user, a certain number of connections, etc.

In 5G Network Resource Model (NRM) specifications, 3GPP uses the DataType coverageAreaTAList, which consists of a list of tracking areas as shown in the table above, to define the geographical area where a slice or a slice subnet shall be available. coverageAreaTAList is used as an attribute in the ServiceProfile DataType, which represents the properties of network slice related requirements that should be supported by the network slice instance in 5G network. Moreover, it is used in the same way as an attribute in the SliceProfile DataType to represent the properties of network slice subnet-related requirement that should be supported by the network slice subnet instance in 5G network (3GPP Technical Specification (TS) 28.541).

A TA is a logical aggregation of a group of cells defined by the 3GPP RAN and is mainly used for idle mode mobility tracking purposes. For this reason, a TA is not necessarily an appropriate geographical area.

An intermediate universal Geographical Area Description (GAD) is defined in 3GPP TS 23.032, which subscriber applications, Global System for Mobile Communications (GSM) or Universal Mobile Telecommunications System (UMTS) services can use and the network can convert into an equivalent radio coverage map.

However, the interpretation is made by the Public Land Mobile Network (PLMN) operator of the geographical area in terms of cells actually used. Cells that are partly within the geographical area and all other technical and quality of service aspects are out of the scope of 3GPP TS 23.032. Among others, the specification defines a set of geometrical objects (e.g., ellipsoids, polygons) for GAD.

Performance requirements for next generation new services and markets is elaborated in 3GPP TS 22.261. The list of parameters includes experienced data rate DL/UL, area traffic capacity DL/UL, overall user density per $km^2$, activity factor, UE speed, and coverage. For the latter, no formal expression is used, it is only described verbally (e.g., "full network", "office and residential", "along railways/roads").

Additionally, TeleManagement Forum (TMF) uses e.g. in "TM Forum GB922, "Information Framework (SID)", Rel . 18.5, 2018" the rather abstract concept of a "physical resource" with a given "physical resource description", describing the resource(s) associated with a given service instance. For mobile networks, in particular the radio access part, the "physical resource" lacks further details on how RAN resources shall be described and how they are combined to achieve the agreed minimum performance level.

The notion of geographical area in the context of network slicing introducing a more fine-grained area description compared to the RA and TA is known. In particular, the ServiceProfile DataType can be extended with the following attributes, New DataType Geographical Area (GA) that uses physical reference frames (e.g. geographical coordinates) for describing locations or areas
perfReq attribute as defined in [1], [5], but per geographical base unit (e.g., per area base unit); e.g., for eMBB, this contains:
  expDataRateDL (Integer),
  expDataRateUL (Integer),
  areaTrafficCapDL (Integer),
  areaTrafficCapUL (Integer),
  userDensity (Integer),
  activityFactor (Integer),
  uESpeed (Integer).
All values could be defined using min/max or probability distribution with predefined spatial resolution.

For slice operations, 3GPP currently focuses on the 5G network. However, a slice request in a realistic scenario defined by a third party or vertical would require service capabilities and an according set of resources irrespective of radio technology at a specified geographical area for supporting an indicated service or set of services, for a certain user distribution that can be represented as, e.g., (minimum, average, maximum) tuple of number of users and for a particular time duration. Such slice would be configured and supported across a single and/or multiple radio technologies that a mobile operator has available at the geographical area where the slice is requested. This multi-RAT aggregated abstraction and representation of coverage and merged radio capabilities beyond of a single technology is currently not supported within the 3GPP network slice management architecture and information object classes.

As mentioned above, while currently the requirements for a slice are described by a set of parameters in either ServiceProfile/SliceProfile, the slice is characterized to support a required number of users, a specific up/downlink throughput per slice or per user, a certain number of connections, etc.

3GPP as well as GSM Association (GSMA, Global System for Mobile Communications Association) state these requirements uniformly across the slice as a whole. This is in strong contradiction to the fact that in most cases neither the capabilities and properties of a cellular mobile network are distributed uniformly across a larger area nor the distribution of UEs and their demand for connectivity is evenly distributed.

Further, the currently known solutions to automate the management of networks and slices are based on the notion of resources that, by some management system, are selected in a proper way to provide the service required by the customer. In particular, for the domain of radio networks, such approach has not been applied because the notion of a "resource" as probably known in other domains cannot be applied for the radio due to the fundamental difference between fixed line transport links and radio links. Two routers connected by a cable or fiber are providing a link with very well-defined behavior and rather static capabilities that can be modelled very precisely as a well-described "resource". Automation tools compose a required service by combining "resources". If resources are well-defined and have rather static characteristics, like fixed line links, then automation algorithms for combining and aggregating resources are able to provide well-defined results.

In contrast, neither a "cell", a "tracking area" (TA), nor a base transceiver station (BTS) can be (easily) described as an abstracted "resource" because the capabilities and conditions of the radio links are varying considerably within any cell, TA, and BTS, depending on the location of the UE and the dynamic environmental conditions (season, weather, mobility of other objects).

Hence, the problem arises that to enable the aforementioned automation of combining and aggregating resources in the radio domain, the capabilities of the radio networks as well as the requirements for the service/slice must be described with respect to geographical areas. The area abstractions/formats describing the slice requirements do not necessarily match the area abstractions and formats that describe the radio network capabilities, such as signal strength or coverage. It is therefore an object of the present invention to provide a management system and corresponding methods and apparatuses selecting and combining the proper radio features associated with parts of the radio network to match the (non-uniform) requirements of the service/slice.

Hence, there is a need to provide for realization of and compliance with service level agreements in network slice scenarios joining multiple network capabilities.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a repository entity, the method comprising generating a plurality of area base units, each area base unit being defined by a geographical zone corresponding to said area base unit, a network access technology of resources of said area base unit, and network capabilities and network features provided by said resources of said area base unit, wherein said network capabilities provided by said resources of said area base unit are the same over said geographical zone corresponding to said area base unit and said network features provided by said resources of said area base unit are uniform over said geographical zone corresponding to said area base unit, and storing said plurality of area base units.

According to an exemplary aspect of the present invention, there is provided a method of a service management entity, the method comprising receiving a network slice request including network slice service requirements and a slice geographical area corresponding to a network slice according to said network slice request, and deriving, based on said network slice service requirements, demand network capabilities and demand network features uniformly needed over said slice geographical area to fulfill said network slice service requirements.

According to an exemplary aspect of the present invention, there is provided a method of a slice management entity, the method comprising receiving a network resource combination request including information on demand network capabilities and demand network features over a slice geographical area, transmitting, to an area base units repository, a request for at least one area base unit fulfilling at least one predetermined criterion in relation to said network resource combination request, receiving, from said area base units repository, area base units fulfilling said at least one predetermined criterion out of stored area base units, generating at least one area base units join, wherein each of said at least one area base units join includes a combination of at least one area base unit of said area base units, for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and for each of said at least one area base units join, said combined network capabilities and network features of said combination of said at least one area base unit meet said demand network capabilities and demand network features over said join geographical area corresponding to said area base units join, and the method further comprising selecting at least one selected area base units join of said at least one area base units join such that a combination of join geographical areas of said at least one selected area base units join covers said slice geographical area, and combining said at least one selected area base units join as a network resource combination.

According to an exemplary aspect of the present invention, there is provided an apparatus of a repository entity, the apparatus comprising generating circuitry configured to generate a plurality of area base units, each area base unit being defined by a geographical zone corresponding to said area base unit, a network access technology of resources of said area base unit, and network capabilities and network features provided by said resources of said area base unit, wherein said network capabilities provided by said resources of said area base unit are the same over said geographical zone corresponding to said area base unit and said network features provided by said resources of said area base unit are uniform over said geographical zone corresponding to said area base unit, and storing circuitry configured to store said plurality of area base units.

According to an exemplary aspect of the present invention, there is provided an apparatus of a service management entity, the apparatus comprising receiving circuitry configured to receive a network slice request including network slice service requirements and a slice geographical area corresponding to a network slice according to said network slice request, and deriving circuitry configured to derive, based on said network slice service requirements, demand network capabilities and demand network features uniformly needed over said slice geographical area to fulfill said network slice service requirements.

According to an exemplary aspect of the present invention, there is provided an apparatus of a slice management entity, the apparatus comprising receiving circuitry configured to receive a network resource combination request including information on demand network capabilities and demand network features over a slice geographical area, transmitting circuitry configured to transmit, to an area base units repository, a request for at least one area base unit fulfilling at least one predetermined criterion in relation to said network resource combination request, receiving circuitry configured to receive, from said area base units repository, area base units fulfilling said at least one predetermined criterion out of stored area base units, generating circuitry configured to generate at least one area base units join, wherein each of said at least one area base units join includes a combination of at least one area base unit of said area base units, for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and for each of said at least one area base units join, said combined network capabilities and network features of said combination of said at least one area base unit meet said demand network capabilities and demand network features over said join geographical area corresponding to said area base units join, and further comprising selecting circuitry configured to select at least one selected area base units join of said at least one area base units join such that a combination of join geographical areas of said at least one selected area base units join covers said slice geographical area, and combining circuitry configured to combine said at least one selected area base units join as a network resource combination.

According to an exemplary aspect of the present invention, there is provided an apparatus of a network entity, the apparatus comprising
    a first apparatus including receiving circuitry configured to receive a network slice request including network slice service requirements and a slice geographical area corresponding to a network slice according to said network slice request, and deriving circuitry configured to derive, based on said network slice service requirements, demand network capabilities and demand network features uniformly needed over said slice geographical area to fulfill said network slice service requirements, and
    a second apparatus including receiving circuitry configured to receive a network resource combination request including information on demand network capabilities and demand network features over a slice geographical area, transmitting circuitry configured to transmit, to an area base units repository, a request for at least one area base unit fulfilling at least one predetermined criterion in relation to said network resource combination request, receiving circuitry configured to receive, from said area base units repository, area base units fulfilling said at least one predetermined criterion out of stored area base units, generating circuitry configured to generate at least one area base units join, wherein each of said at least one area base units join includes a combination of at least one area base unit of said area base units, for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and for each of said at least one area base units join, said combined network capabilities and network features of said combination of said at least one area base unit meet said demand network capabilities and demand network features over said join geographical area corresponding to said area base units join, and further comprising selecting circuitry configured to select at least one selected area base units join of said at least one area base units join such that a combination of join geographical areas of said at least one selected area base units join covers said slice geographical area, and combining circuitry configured to combine said at least one selected area base units join as a network resource combination.

According to an exemplary aspect of the present invention, there is provided an apparatus of a repository entity, the apparatus comprising at least one processor, at least one memory including computer program code, and at least one interface configured for communication with at least another apparatus, the at least one processor, with the at least one memory and the computer program code, being configured to cause the apparatus to perform generating a plurality of area base units, each area base unit being defined by a geographical zone corresponding to said area base unit, a network access technology of resources of said area base unit, and network capabilities and network features provided by said resources of said area base unit, wherein said network capabilities provided by said resources of said area base unit are the same over said geographical zone corresponding to said area base unit and said network features provided by said resources of said area base unit are uniform over said geographical zone corresponding to said area base unit, and storing said plurality of area base units.

According to an exemplary aspect of the present invention, there is provided an apparatus of a service management entity, the apparatus comprising at least one processor, at least one memory including computer program code, and at least one interface configured for communication with at least another apparatus, the at least one processor, with the at least one memory and the computer program code, being configured to cause the apparatus to perform receiving a network slice request including network slice service requirements and a slice geographical area corresponding to a network slice according to said network slice request, and deriving, based on said network slice service requirements, demand network capabilities and demand network features uniformly needed over said slice geographical area to fulfill said network slice service requirements.

According to an exemplary aspect of the present invention, there is provided an apparatus of a slice management entity, the apparatus comprising at least one processor, at least one memory including computer program code, and at least one interface configured for communication with at least another apparatus, the at least one processor, with the at least one memory and the computer program code, being configured to cause the apparatus to perform receiving a network resource combination request including information on demand network capabilities and demand network features over a slice geographical area, transmitting, to an area base units repository, a request for at least one area base unit fulfilling at least one predetermined criterion in relation to said network resource combination request, receiving, from said area base units repository, said area base units fulfilling said at least one predetermined criterion out of stored area base units, generating at least one area base units join, wherein each of said at least one area base units join includes a combination of at least one area base unit of said area base units, for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and for each of said at least one area base units join, said combined network capabilities and network features of said combination of said at least one area base unit meet said demand network capabilities and demand network features over said join geographical area corresponding to said area base units join, selecting at least one selected area base units join of said at least one area base units join such that a combination of join geographical areas of said at least one selected area base units join covers said slice geographical area, and combining said at least one selected area base units join as a network resource combination.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects efficiently addresses any of the following identified drawbacks.

On the one hand, currently known area abstractions and formats are too coarse to adequately describe performance capabilities of distinct radio features and to create joint capabilities across different RATs.

On the other hand, currently known area abstractions and formats are not suitable to perform matching of the requirements (e.g., regarding coverage area) of a service/slice with the joint performance capabilities of the radio network.

Finally, current network (and service) management does not incorporate functions and procedures to automatically combine performance capabilities of distinct radio features in order to create joint capabilities across a single or different RATs.

Thus, any one of the above aspects efficiently solves at least part of the problems and drawbacks identified in relation to the prior art.

By way of exemplary embodiments of the present invention, it is provided a realization of service level agreements in network slice scenarios joining multiple network capabilities. More specifically, by way of exemplary embodiments of the present invention, there are provided measures and mechanisms for realization of and compliance with service level agreements in network slice scenarios joining multiple network capabilities.

Thus, improvement is achieved by methods, apparatuses and computer program products realizing service level agreements in network slice scenarios joining multiple network capabilities.

BRIEF DESCRIPTION OF THE DRAWINGS

In the following, the present invention will be described in greater detail by way of non-limiting examples with reference to the accompanying drawings, in which FIG. 12 shows a schematic diagram illustrating an example of a repository of area base units maintained according to exemplary embodiments of the present invention, FIG. 13 shows a schematic diagram illustrating an example of joins of selected area base units according to exemplary embodiments of the present invention.

DETAILED DESCRIPTION OF DRAWINGS AND EMBODIMENTS OF THE PRESENT INVENTION

Figure 1:
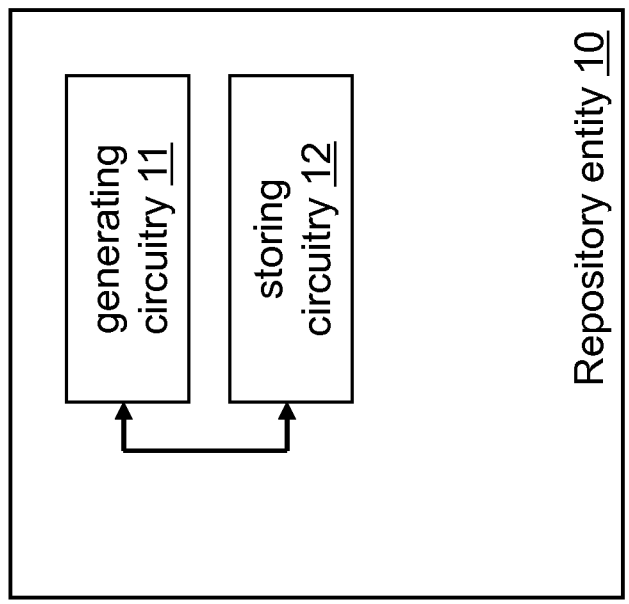
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for realization of and compliance with service level agreements in network slice scenarios joining multiple network capabilities.

In brief, according to exemplary embodiments of the present invention, radio network capabilities and radio features are defined per area base unit (ABU) that are agnostic to a specific radio technology, and these are stored them in an according repository.

Further, according to exemplary embodiments of the present invention, radio network capabilities and features from different radio technologies across multiple (and potentially overlapping) ABUs are joined according to defined operations to create a new radio capability or feature that cannot be realized otherwise.

Finally, according to exemplary embodiments of the present invention, specific join of radio network capabilities and features are created using the above-mentioned available operations. Such operations may comprise defined mathematical operations such as sum, minimum, OR, AND, XOR, or more complex operations. This join shall maximize the similarity, according to a pre-defined measure, with an externally provided object (i.e., the communication service requirements) of the same data structure. The similarity measure or similarity function is a real-valued function that quantifies the similarity between the two objects.

In more detail, FIG. 1 is a block diagram illustrating an apparatus according to exemplary embodiments of the present invention. The apparatus may be a repository entity 10 comprising a generating circuitry 11 and a storing circuitry 12. The generating circuitry 11 generates a plurality of area base units, each area base unit being defined by a geographical zone corresponding to said area base unit, a network access technology of resources of said area base unit, and network capabilities and network features provided by said resources of said area base unit, wherein said network capabilities provided by said resources of said area base unit are the same over said geographical zone corresponding to said area base unit and said network features provided by said resources of said area base unit are uniform over said geographical zone corresponding to said area base unit. The storing circuitry 12 stores said plurality of area base units.

The network features provided by said resources of said area base unit being uniform over said geographical zone corresponding to said area base unit may, according to exemplary embodiments of the present invention, include that the network features provided by said resources of said area base unit are within a same respective range over said geographical zone corresponding to said area base unit. In particular, such uniformity may include that the network features provided by said resources of said area base unit are similar within predefined boundaries.

Figure 8:
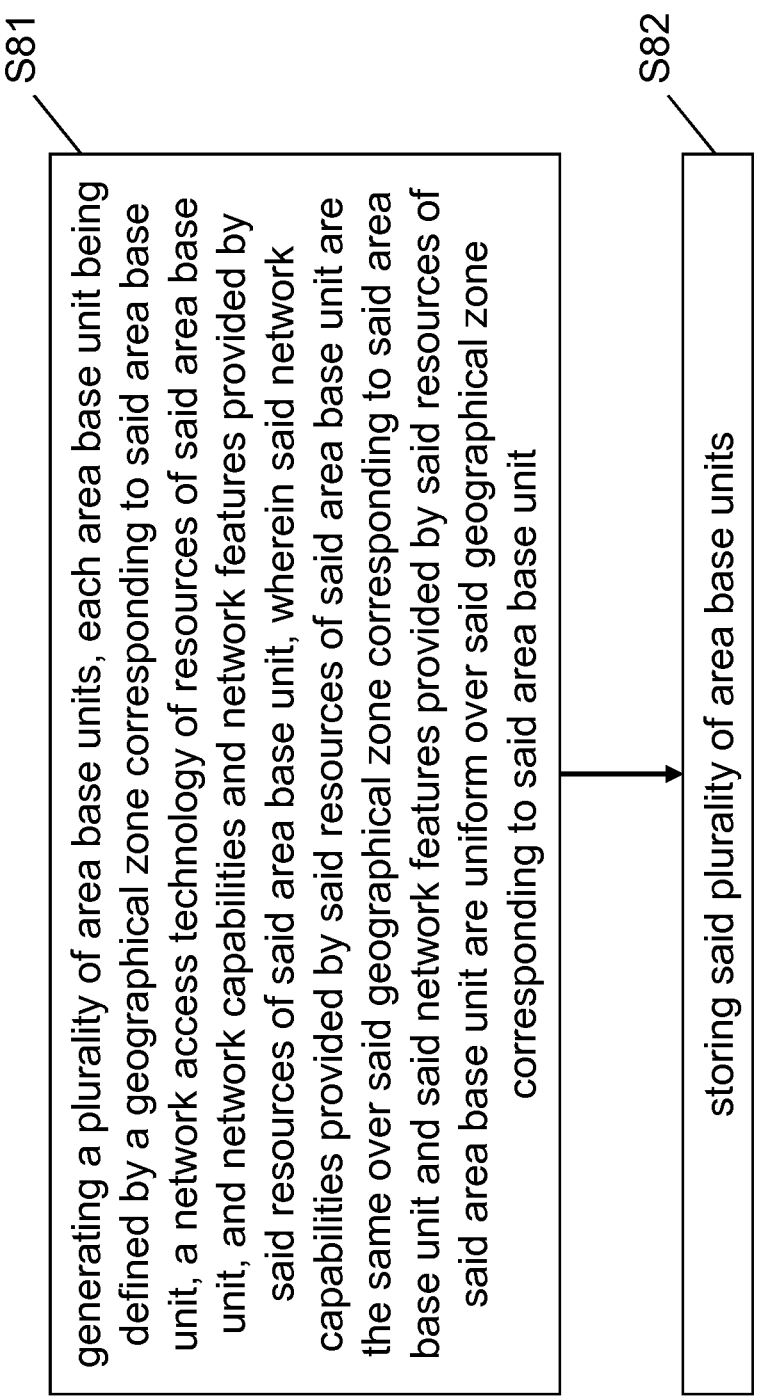
FIG. 8 is a schematic diagram of a procedure according to exemplary embodiments of the present invention.

FIG. 8 is a schematic diagram of a procedure according to exemplary embodiments of the present invention. The apparatus according to FIG. 1 may perform the method of FIG. 8 but is not limited to this method. The method of FIG. 8 may be performed by the apparatus of FIG. 1 but is not limited to being performed by this apparatus.

As shown in FIG. 8, a procedure according to exemplary embodiments of the present invention comprises an operation of generating (S81) a plurality of area base units, each area base unit being defined by a geographical zone corresponding to said area base unit, a network access technology of resources of said area base unit, and network capabilities and network features provided by said resources of said area base unit, wherein said network capabilities provided by said resources of said area base unit are the same over said geographical zone corresponding to said area base unit and said network features provided by said resources of said area base unit are uniform over said geographical zone corresponding to said area base unit, and an operation of storing (S82) said plurality of area base units.

Figure 2:
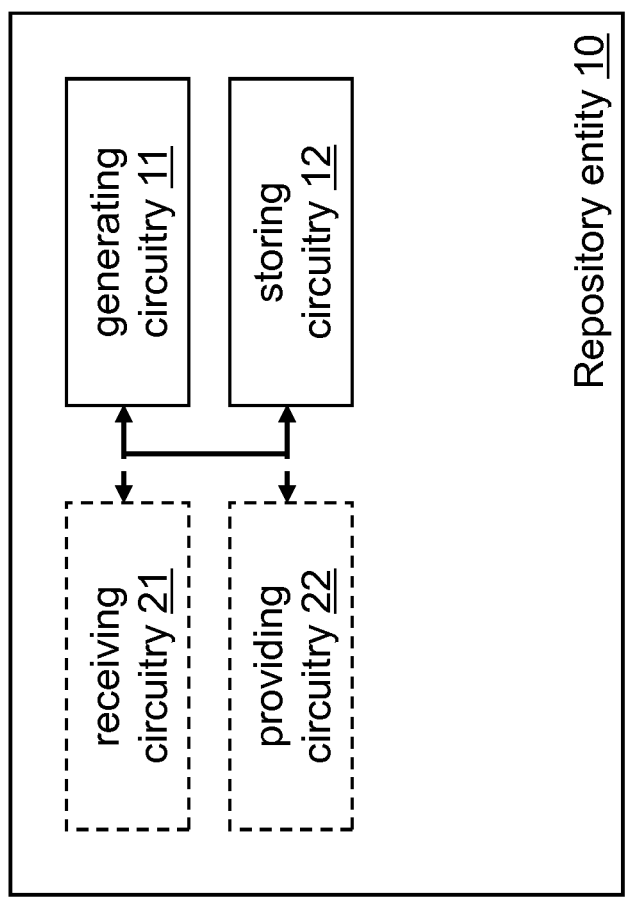
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise receiving circuitry 21 and/or providing circuitry 22.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 8, exemplary additional operations are given, which are inherently independent from each other as such. According to such variation, an exemplary method according to exemplary embodiments of the present invention may comprise an operation of receiving a request for at least one area base unit fulfilling at least one predetermined criterion, and an operation of providing area base units of said plurality of area base units fulfilling said at least one predetermined criterion.

According to further exemplary embodiments of the present invention, said at least one predetermined criterion is at least one of said geographical zone, said network access technology, and said network capabilities and network features.

According to further exemplary embodiments of the present invention, said network capabilities and network features provided by said resources of said area base unit are radio network capabilities and radio network features provided by radio resources.

Radio resources may include e.g. bandwidth, time, transmit power, and/or codes.

According to further exemplary embodiments of the present invention, said network access technology is a radio access technology.

According to further exemplary embodiments of the present invention, said geographical zone is defined as one of coordinates defining a polygon, geo-hashes, plus codes, and S2 cells.

Figure 3:
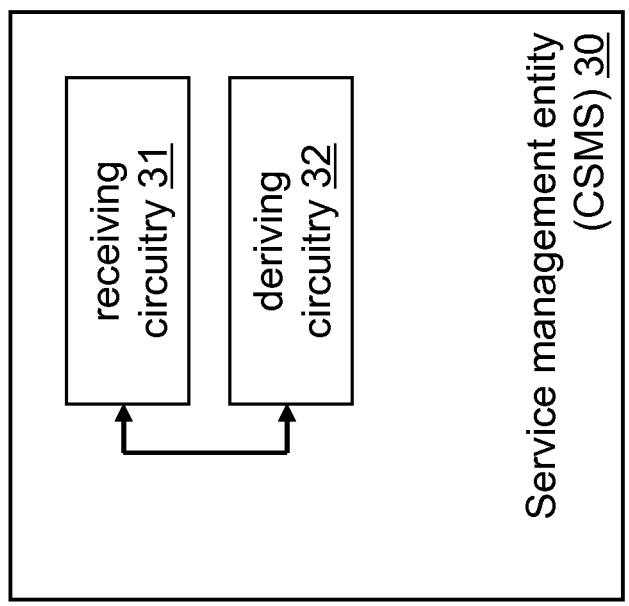
FIG. 3 is a block diagram illustrating an apparatus according to exemplary embodiments of the present invention.
Figure 9:
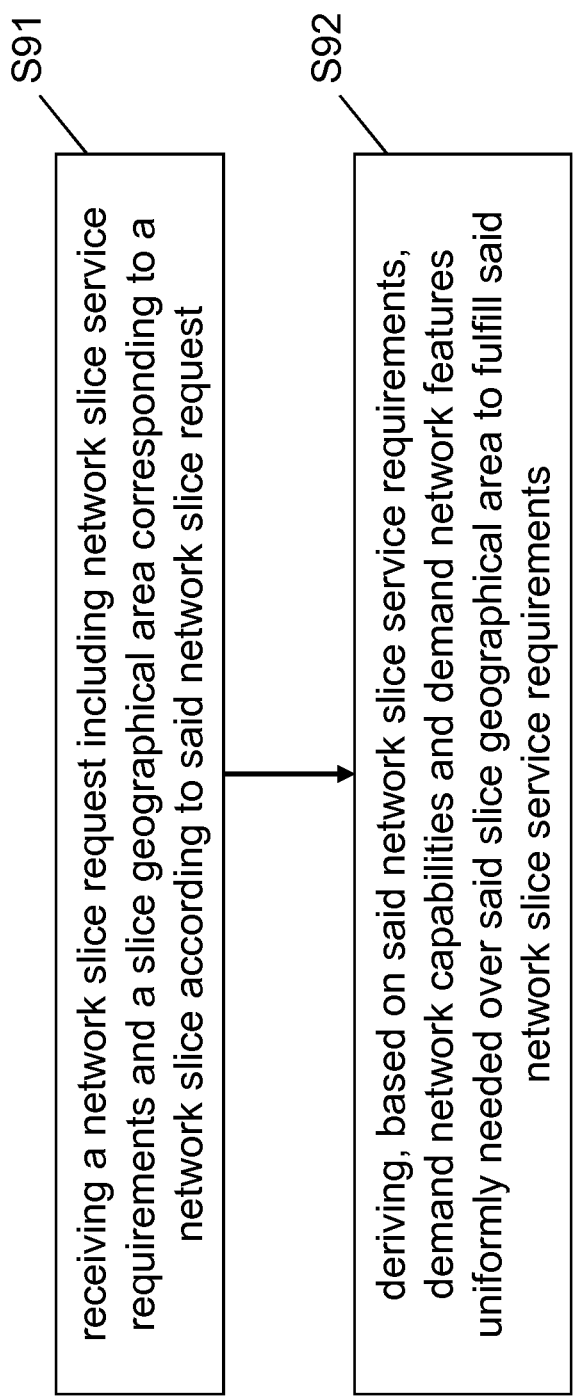
FIG. 9 is a schematic diagram of a procedure according to exemplary embodiments of the present invention.

FIG. 3 is a block diagram illustrating an apparatus according to exemplary embodiments of the present invention. The apparatus may be a service management entity 30 such as a Communication Service Management Service (CSMS) comprising a receiving circuitry 31 and a deriving circuitry 32. The receiving circuitry 31 receives a network slice request including network slice service requirements and a slice geographical area corresponding to a network slice according to said network slice request. The deriving circuitry 32 derives, based on said network slice service requirements, demand network capabilities and demand network features uniformly needed over said slice geographical area to fulfill said network slice service requirements. FIG. 9 is a schematic diagram of a procedure according to exemplary embodiments of the present invention. The apparatus according to FIG. 3 may perform the method of FIG. 9 but is not limited to this method. The method of FIG. 9 may be performed by the apparatus of FIG. 3 but is not limited to being performed by this apparatus.

As shown in FIG. 9, a procedure according to exemplary embodiments of the present invention comprises an operation of receiving (S91) a network slice request including network slice service requirements and a slice geographical area corresponding to a network slice according to said network slice request, and an operation of deriving (S92), based on said network slice service requirements, demand network capabilities and demand network features uniformly needed over said slice geographical area to fulfill said network slice service requirements.

Figure 4:
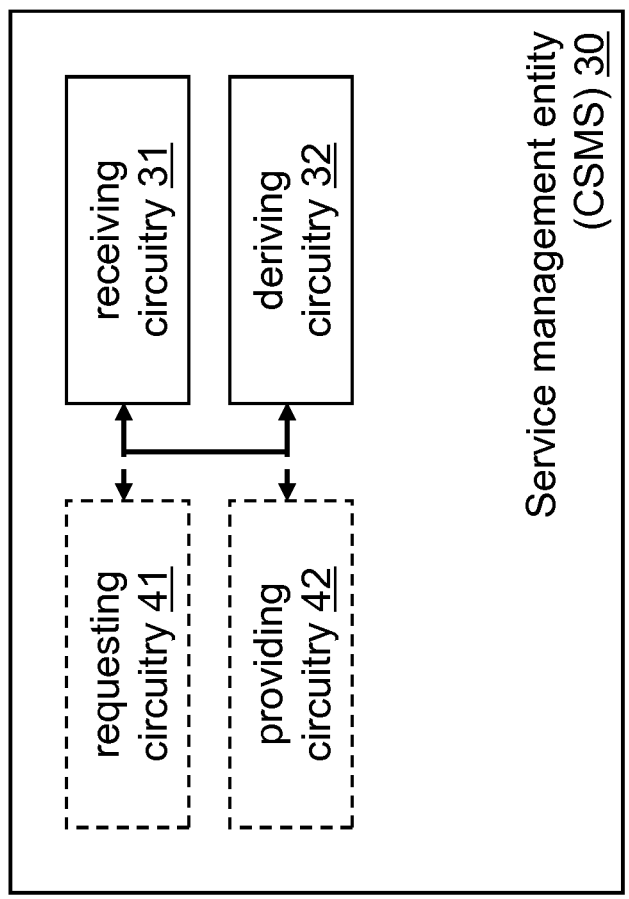
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise requesting circuitry 41 and/or providing circuitry 42.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 9, exemplary additional operations are given, which are inherently independent from each other as such. According to such variation, an exemplary method according to exemplary embodiments of the present invention may comprise an operation of requesting a network resource combination meeting said demand network capabilities and demand network features over said slice geographical area.

According to a variation of the procedure shown in FIG. 9, exemplary additional operations are given, which are inherently independent from each other as such. According to such variation, an exemplary method according to exemplary embodiments of the present invention may comprise an operation of receiving said network resource combination in response to said network resource combination request.

According to a variation of the procedure shown in FIG. 9, exemplary additional operations are given, which are inherently independent from each other as such. According to such variation, an exemplary method according to exemplary embodiments of the present invention may comprise an operation of providing said network resource combination in response to said network slice request.

Figure 5:
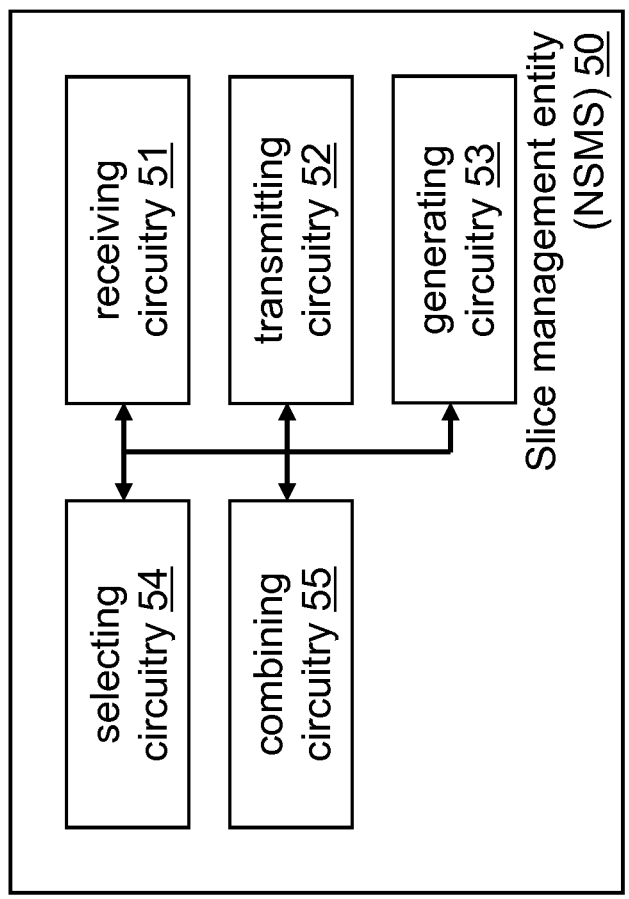
FIG. 5 is a block diagram illustrating an apparatus according to exemplary embodiments of the present invention.

FIG. 5 is a block diagram illustrating an apparatus according to exemplary embodiments of the present invention. The apparatus may be a slice management entity 50 such as a Network Slice Management Service (NSMS) comprising a receiving circuitry 51, a transmitting circuitry 52, a generating circuitry 53, a selecting circuitry 54, and a combining circuitry 55. The receiving circuitry 51 receives a network resource combination request including information on demand network capabilities and demand network features over a slice geographical area. The transmitting circuitry 52 transmits, to an area base units repository, a request for at least one area base unit fulfilling at least one predetermined criterion in relation to said network resource combination request. The receiving circuitry 51 further receives, from said area base units repository, area base units fulfilling said at least one predetermined criterion out of stored area base units. The generating circuitry 53 generates at least one area base units join. Here, it is noted that each of said at least one area base units join includes a combination of at least one area base unit of said area base units, that for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and that for each of said at least one area base units join, said combined network capabilities and network features of said combination of said at least one area base unit meet said demand network capabilities and demand network features over said join geographical area corresponding to said area base units join. The selecting circuitry 54 selects at least one selected area base units join of said at least one area base units join such that a combination of join geographical areas of said at least one selected area base units join covers said slice geographical area. The combining circuitry 55 combines said at least one selected area base units join as a network resource combination.

The combined network features of said combination of said at least one area base unit being uniform over said join geographical zone corresponding to said area base units join may, according to exemplary embodiments of the present invention, include that the combined network features of said combination of said at least one area base unit are within a same respective range over said join geographical zone corresponding to said area base units join. In particular, such uniformity may include that the combined network features of said combination of said at least one area base unit are similar within predefined boundaries.

It is noted that a repository entity 10 according to FIG. 1 or 2 may be integrated with the present slice management entity 10 or may be provided separately from the present slice management entity 50.

Figure 10:
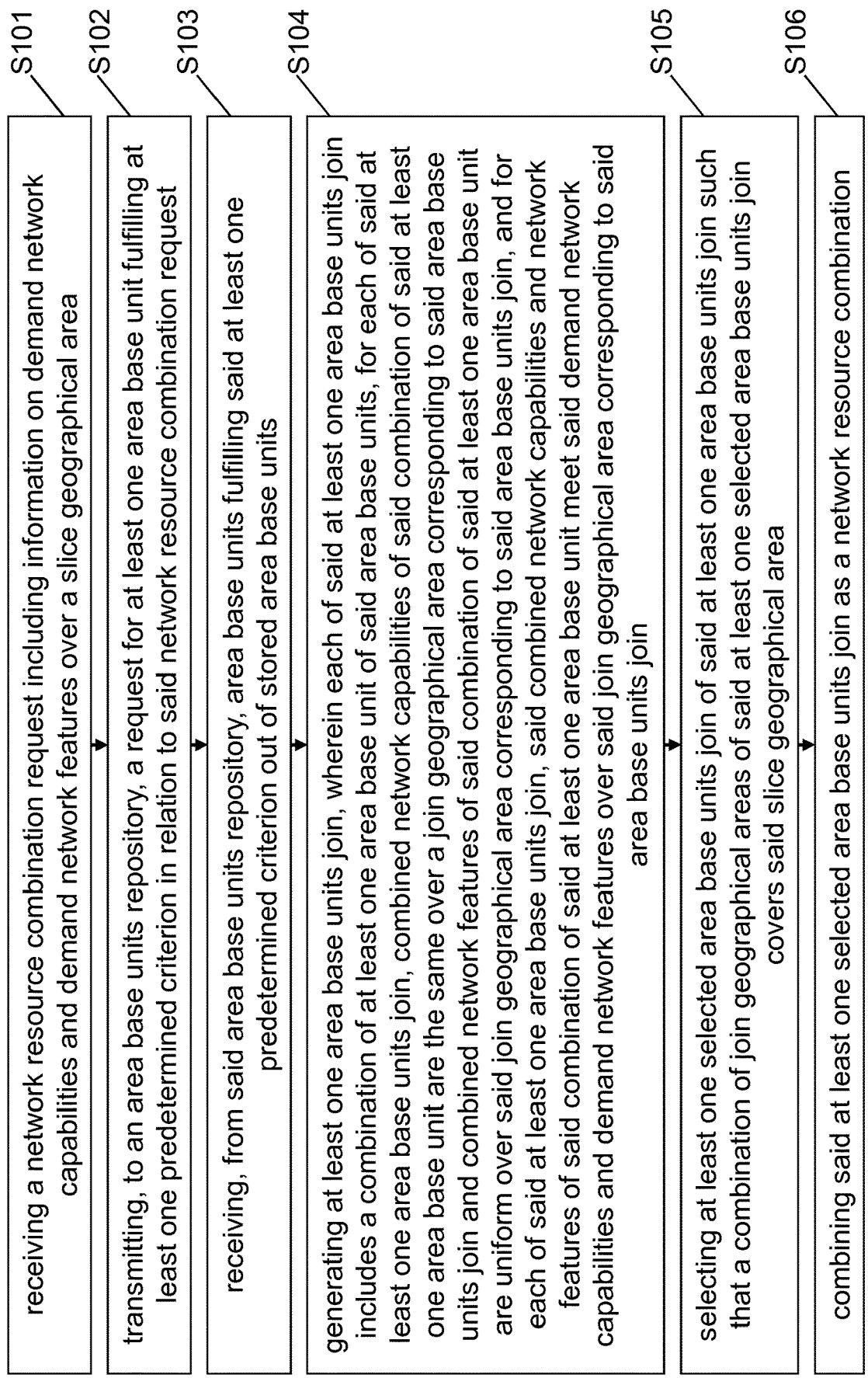
FIG. 10 is a schematic diagram of a procedure according to exemplary embodiments of the present invention.

FIG. 10 is a schematic diagram of a procedure according to exemplary embodiments of the present invention. The apparatus according to FIG. 5 may perform the method of FIG. 10 but is not limited to this method. The method of FIG. 10 may be performed by the apparatus of FIG. 5 but is not limited to being performed by this apparatus.

As shown in FIG. 10, a procedure according to exemplary embodiments of the present invention comprises an operation of receiving (S101) a network resource combination request including information on demand network capabilities and demand network features over a slice geographical area, an operation of transmitting (S102), to an area base units repository, a request for at least one area base unit fulfilling at least one predetermined criterion in relation to said network resource combination request, an operation of receiving (S103), from said area base units repository, area base units fulfilling said at least one predetermined criterion out of stored area base units, an operation of generating (S104) at least one area base units join (wherein each of said at least one area base units join includes a combination of at least one area base unit of said area base units, for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and for each of said at least one area base units join, said combined network capabilities and network features of said combination of said at least one area base unit meet said demand network capabilities and demand network features over said join geographical area corresponding to said area base units join), an operation of selecting (S105) at least one selected area base units join of said at least one area base units join such that a combination of join geographical areas of said at least one selected area base units join covers said slice geographical area, and an operation of combining (S106) said at least one selected area base units join as a network resource combination.

Figure 6:
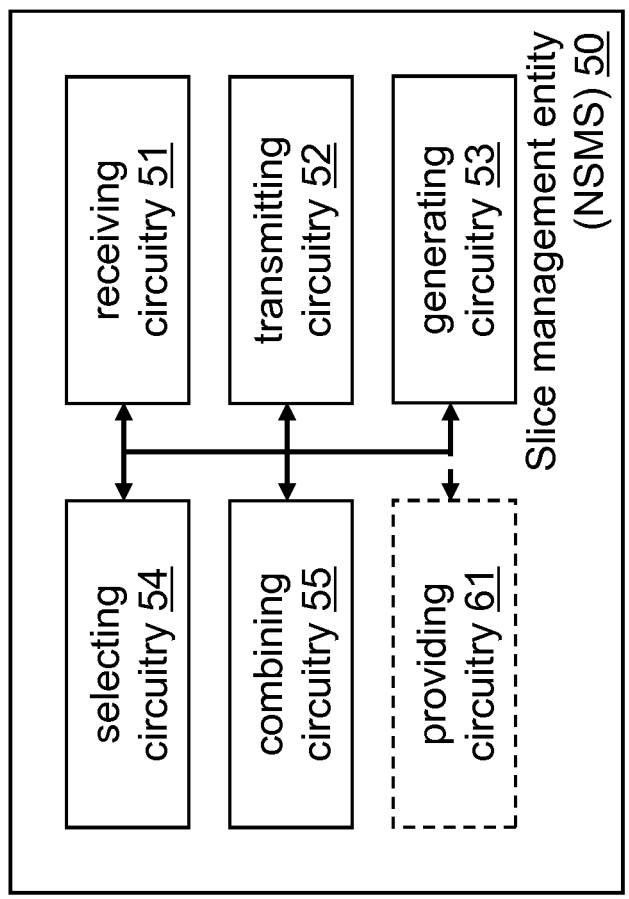
FIG. 6 is a block diagram illustrating an apparatus according to exemplary embodiments of the present invention.

FIG. 6 is a block diagram illustrating an apparatus according to exemplary embodiments of the present invention. In particular, FIG. 6 illustrates a variation of the apparatus shown in FIG. 5. The apparatus according to FIG. 6 may thus further comprise a providing circuitry 61.

In an embodiment at least some of the functionalities of the apparatus shown in FIG. 5 (or 6) may be shared between two physically separate devices forming one operational entity. Therefore, the apparatus may be seen to depict the operational entity comprising one or more physically separate devices for executing at least some of the described processes.

According to a variation of the procedure shown in FIG. 10, exemplary additional operations are given, which are inherently independent from each other as such. According to such variation, an exemplary method according to exemplary embodiments of the present invention may comprise an operation of providing said network resource combination in response to said network resource combination request.

According to further exemplary embodiments of the present invention, said at least one area base units join includes a combination of at least one area base unit providing resources of a first network access technology and at least one area base unit providing resources of a second network access technology.

According to one alternative, the first network access technology and the second network access technology are the same. This might be implemented by the first network access technology and the second network access technology being the same radio access technology. An example of such case is Carrier Aggregation of two LTE cells.

According to another alternative, the first network access technology and the second network access technology are different from each other. This might be implemented by the first network access technology and the second network access technology being different radio access technologies. An example of such case is an LTE cell offloading traffic to a WiFi cell.

According to further exemplary embodiments of the present invention, said combined network capabilities and network features include at least one of uplink bandwidth, downlink bandwidth, latency, resiliency, reliability, stationary user support, nomadic user support, coordinated multipoint, carrier aggregation, hybrid access, bearer splitting, offloading policies, and charging rules.

According to further exemplary embodiments of the present invention, each stored area base unit being defined by a geographical zone corresponding to said stored area base unit, a network access technology of resources of said stored area base unit, and network capabilities and network features provided by said resources of said stored area base unit, wherein said network capabilities provided by said resources of said stored area base unit are the same over said geographical zone corresponding to said stored area base unit and said network features provided by said resources of said stored area base unit are uniform over said geographical zone corresponding to said stored area base unit.

The network features provided by said resources of said stored area base unit being uniform over said geographical zone corresponding to said stored area base unit may, according to exemplary embodiments of the present invention, include that the network features provided by said resources of said stored area base unit are within a same respective range over said geographical zone corresponding to said stored area base unit. In particular, such uniformity may include that the network features provided by said resources of said stored area base unit are similar within predefined boundaries.

According to further exemplary embodiments of the present invention, said at least one predetermined criterion is at least one of said geographical zone, said network access technology, and said network capabilities and network features.

According to further exemplary embodiments of the present invention, said geographical zone is defined as one of coordinates defining a polygon, geo-hashes, plus codes, and S2 cells.

Figure 7:
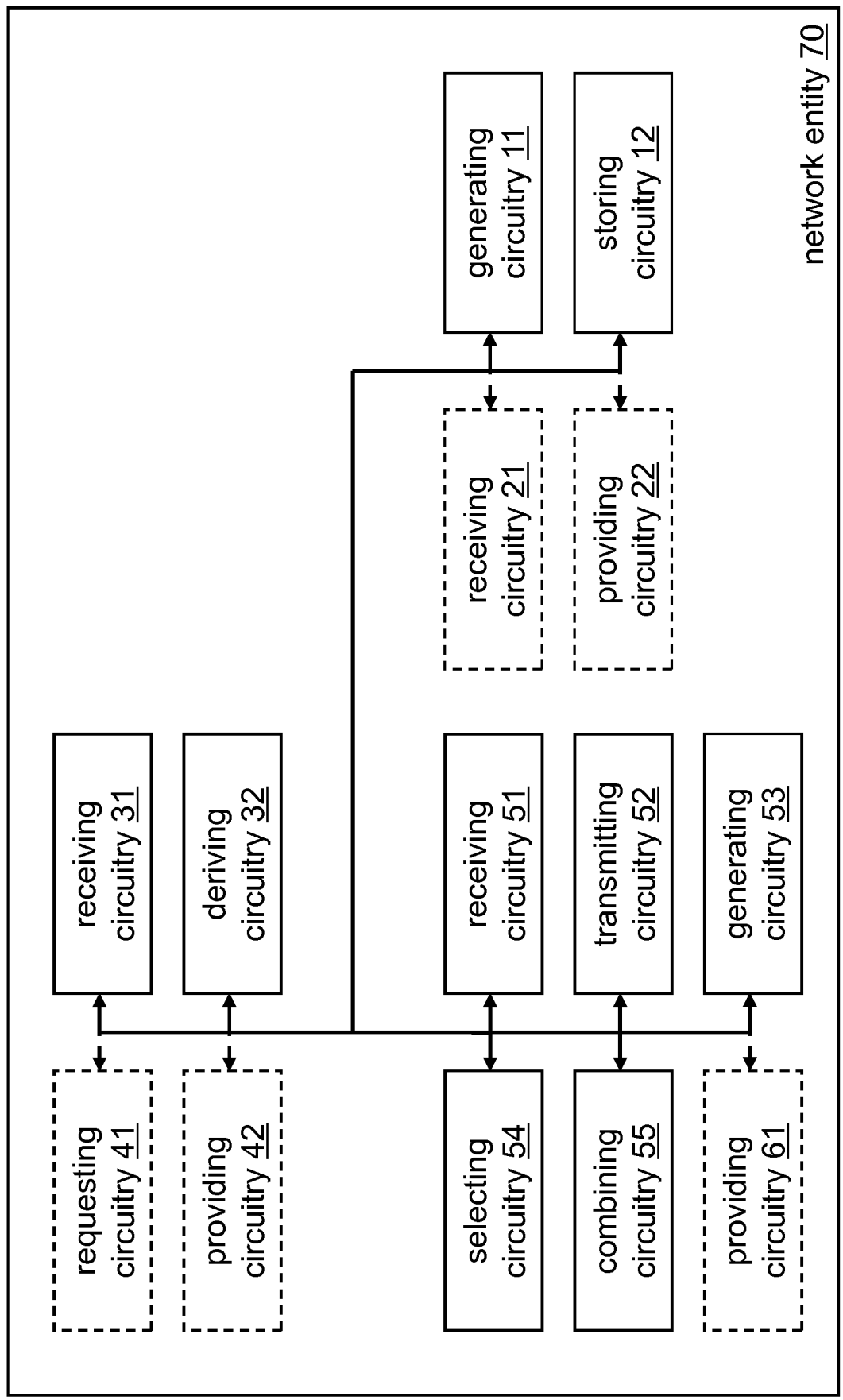
FIG. 7 is a block diagram illustrating an apparatus according to exemplary embodiments of the present invention.

FIG. 7 is a block diagram illustrating an apparatus according to exemplary embodiments of the present invention. The apparatus may be a network entity 70 comprising some or any of circuitries discussed above in relation to the repository entity 10, the service management entity 30, and/or the slice management entity 50.

That is, according to exemplary embodiments of the present invention, some or all of the functionalities of the repository entity 10, the service management entity 30, and/or the slice management entity 50 may be embodied by a single network entity 70.

In more specific terms, according to exemplary embodiments of the present invention, several extensions in the process of mapping the ServiceProfile to one or several corresponding SliceProfiles, executed by the NSMS, are defined. In this process, the NSMS considers the ServiceProfile attributes to select and match features and capabilities of individual RATs as well as potential joint operations of multiple RATs in the same or overlapping areas.

Figure 11:
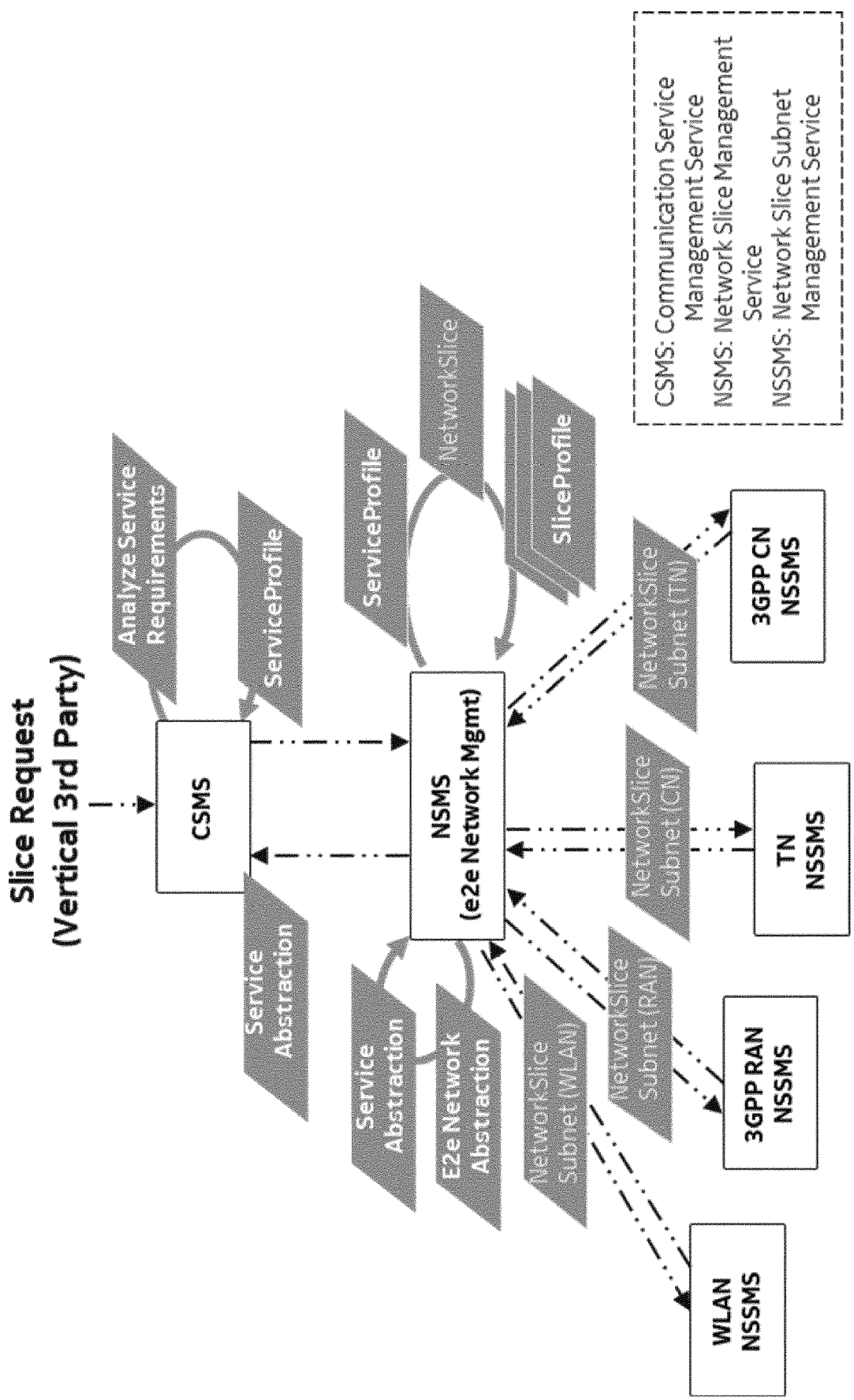
FIG. 11 is a schematic diagram illustrating functionalities of an apparatus or a group of apparatuses according to exemplary embodiments of the present invention.

The overall process is depicted in FIG. 11.

FIG. 11 is a schematic diagram illustrating functionalities of an apparatus or a group of apparatuses according to exemplary embodiments of the present invention. In particular, FIG. 11 illustrates an apparatus or an apparatus compound for managing ServiceProfile and SliceProfiles attributes.

The ServiceProfile attributes are derived by analyzing the service requirements of an incoming slice request by the CSMS (Communication Service Management Service). Subsequently, ServiceProfile attributes are fed to the NSMS (Network Slice Management Service), which according to exemplary embodiments of the present invention, performs a combination of network features, capabilities and associated resources to meet the attributes, i.e. to maximize the similarity measure between attributes required by the ServiceProfile and implemented in the network.

Heretofore, exemplary embodiments of the present invention particularly focus on the RAN domain.

The two steps described above, i.e. analyzing the service to service requirements and mapping the service requirements to network resources, are logically distinct. Nevertheless, according to exemplary embodiments of the present invention, these can be realized either as two steps performed in a service management entity (CSMS) and in an end-to-end network slice management entity (NSMS) or as a single step performed in a service management entity (or network entity).

In the course of the process outlined with respect to FIG. 11, according to exemplary embodiments of the present invention, radio network capabilities and features are determined per area base unit (ABU).

Combining of RAT features and capabilities requires a repository that contains and maintains these features and capabilities and the associated radio resources. According to exemplary embodiments of the present invention, such repository is generated and provided as follows. Features and capabilities are modelled using a sufficient level of abstraction (i.e., largely technology-agnostic) in order to allow for the inclusion of different RATs. The repository can reside, e.g. at the NSMS level. The repository is organized using a reference geographical unit, referred to as "area base unit (ABU)". Within an ABU, a uniform performance is realized by the means of selected radio features.

An "ABU" considers a single RAT and contains a geographical area where the same radio performance can be achieved, i.e., the same radio features can be applied, and an almost uniform resource occupation and user density can be supported. Such characteristics make each "ABU" to provide a roughly homogeneous performance, i.e. providing almost uniform maximum-minimum limits in terms of, e.g., bandwidth, latency, etc. within the represented geographical area.

An example of an ABU repository is illustrated in FIG. 12.

FIG. 12 shows a schematic diagram illustrating an example of a repository of area base units maintained according to exemplary embodiments of the present invention. In particular, FIG. 12 illustrates an example of an ABU repository in RAN domain and association of ABUs for joint features, listing some examples of ABUs considering the aforementioned parameters.

As is derivable from FIG. 12, according to exemplary embodiments of the present invention, each ABU is associated to a RAT with distinct radio features and/or capability, policy, and defined coordinates of the ABU.

The last two columns, i.e. "joint features (overlapping ABUs)" and "joint policy (overlapping ABUs)" are extensions for the join of radio network capabilities and features from different radio technologies described below.

For the geographical coordinates of ABUs, according to exemplary embodiments of the present invention, one of the following concepts is used:
coordinates defining a polygon (used in FIG. 6-3),
geo-hashes,
"plus codes" as discussed in "Open Location Code (OLC) System, "Plus Codes", https://plus.codes/", or
"S2 cells" as discussed in "S2 Geometry, "S2 Cells", http://s2geometry.io/devguide/s2cell_hierarchy.html".

However, the geographical coordinates of ABUs are not limited to the above-mentioned concepts.

A similar quantization of the network into ABUs of e.g. 10 m×10 m is e.g. used by the localization method "enhanced Cell Id and Timing Advance (eCITA)". eCITA uses so-called pixels for RF-fingerprinting, where each pixel is associated with the expected signal strengths of the cells that can be received at the location of the pixel. The Serving Mobile Location Service (SMLC) compares the expected signal strengths associated to the pixels with the measured signal strengths reported by the user equipment UE. From this, the SMLC is able to infer the areas ("pixels") where the UE might be located. Together with information on Cell Id and Timing Advance, the SMLC is able to locate the UE with very high accuracy.

According to exemplary embodiments of the present invention, the single ABUs have fixed sizes.

However, according to further exemplary embodiments of the present invention, the size of the ABUs is variable depending on the uniformity of network features and capabilities.

Thus, according to further exemplary embodiments of the present invention, a predetermined number (e.g. two, three, a few) of pre-defined sizes of ABUs is utilized, e.g., to differentiate between macro cells and small cells, or to differentiate between indoor/hot spot areas and regular environments.

However, in any of the above-mentioned alternative embodiments, the area of the network is quantized as much as necessary.

In the course of the process outlined with respect to FIG. 11, according to exemplary embodiments of the present invention, radio network capabilities and features from different radio technologies are joined (respective joins are generated).

Namely, according to exemplary embodiments of the present invention, the NSMS (if implemented in the NSMS) does not only maintain repository entries with respect to the features and capabilities of individual RATs per ABU, but also combines multiple per-RAT features and capabilities to create joint RAT operations at the same or overlapping areas.

In the following, some examples of such combinations of multiple per-RAT features and capabilities to create joint RAT operations at the same or overlapping areas are given below:
- performance capabilities related with a joint operation of different RATs, including, but not limited to, the following set of performance parameters: bandwidth (uplink/downlink), latency, resiliency, etc.,
- user mobility profile and/or service characteristics that joint RATs can support, including, e.g.
  - WiFi suits stationary users, while LTE can support both stationary and nomadic users, etc.,
  - WiFi cannot support high reliability and low latency service, mmWave can support high capacity services, etc.,
- radio features that combined RATs can offer, e.g. CoMP, Carrier Aggregation, etc.,
- radio and access features across different RATs and/or access technologies, e.g. hybrid access, bearer splitting, etc.,
- policies that can be applied in a combined multi-RAT, e.g. offloading policies, and
- charging rules associated with using different RATs.

According to exemplary embodiments of the present invention, for each feature or capability, the combination is done according to a defined mathematical operation, such as sum, minimum, OR, AND, XOR, or more complex operations.

Figure 14:
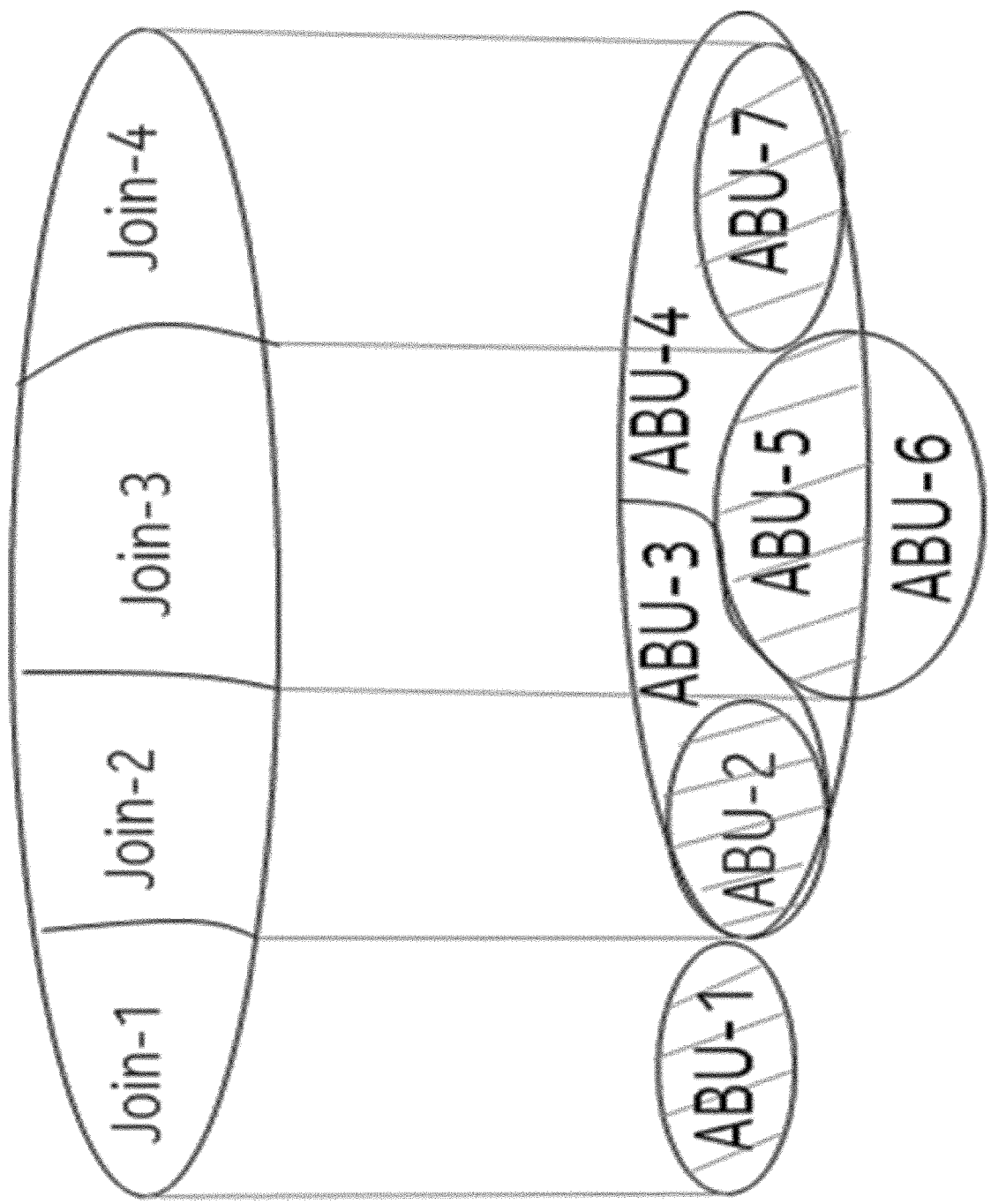
FIG. 14 shows a schematic diagram illustrating said joins of selected area base units of FIG. 13 according to exemplary embodiments of the present invention.

Such operation will create either associations between ABU entries, listing joint RAT radio features and policies (see FIG. 12, last two columns as mentioned above), or completely new ABU entries with novel features and capabilities that can only be realized by joining such ABUs (see FIGS. 13 and 14).

FIG. 13 shows a schematic diagram illustrating an example of joins of selected area base units according to exemplary embodiments of the present invention. FIG. 14 shows a schematic diagram illustrating said joins of selected area base units of FIG. 13 according to exemplary embodiments of the present invention. In particular, FIGS. 13 and 14 illustrate the creation of joins of ABUs with new features and capabilities.

Similar to ABUs, a join of ABUs is an area with rather uniform capabilities. Different joins of individual ABUs will lead to different feature sets and capabilities. Joins of ABUs can hence combine distinct radio features and policies, e.g. two channels can be combined by carrier aggregation to enhance throughput for selected users.

In the course of the process outlined with respect to FIG. 11, according to exemplary embodiments of the present invention, ABUs are joined/combined to achieve a target QoS and coverage.

According to exemplary embodiments of the present invention, the objective of the repository (or the entity accessing the repository) is to combine available ABU entries in such way that a defined ServiceProfile (particularly SLA and geographical area (GA) of radio coverage) can be realized. Geographically, the final join of geographical coordinates needs to cover the GA of the ServiceProfile, while the join of features and capabilities needs to deliver the required SLA.

According to exemplary embodiments of the present invention, the combination of ABUs is performed by the NSMS considering the ServiceProfile and the associated GA on the one hand and the resource ABUs on the other (i.e. the bottom-up resource combination per RAT). The desired SLA is achieved by combining one or more (potentially overlapping) ABUs that form joint radio features and capabilities with defined policies.

This procedure is illustrated by means of the following two concrete examples utilizing the principles according to exemplary embodiments of the present invention.

In a first example, the basic idea of combining ABUs and joins of ABUs to form ServiceProfile GAs is illustrated with reference to FIG. 15.

Figure 15:
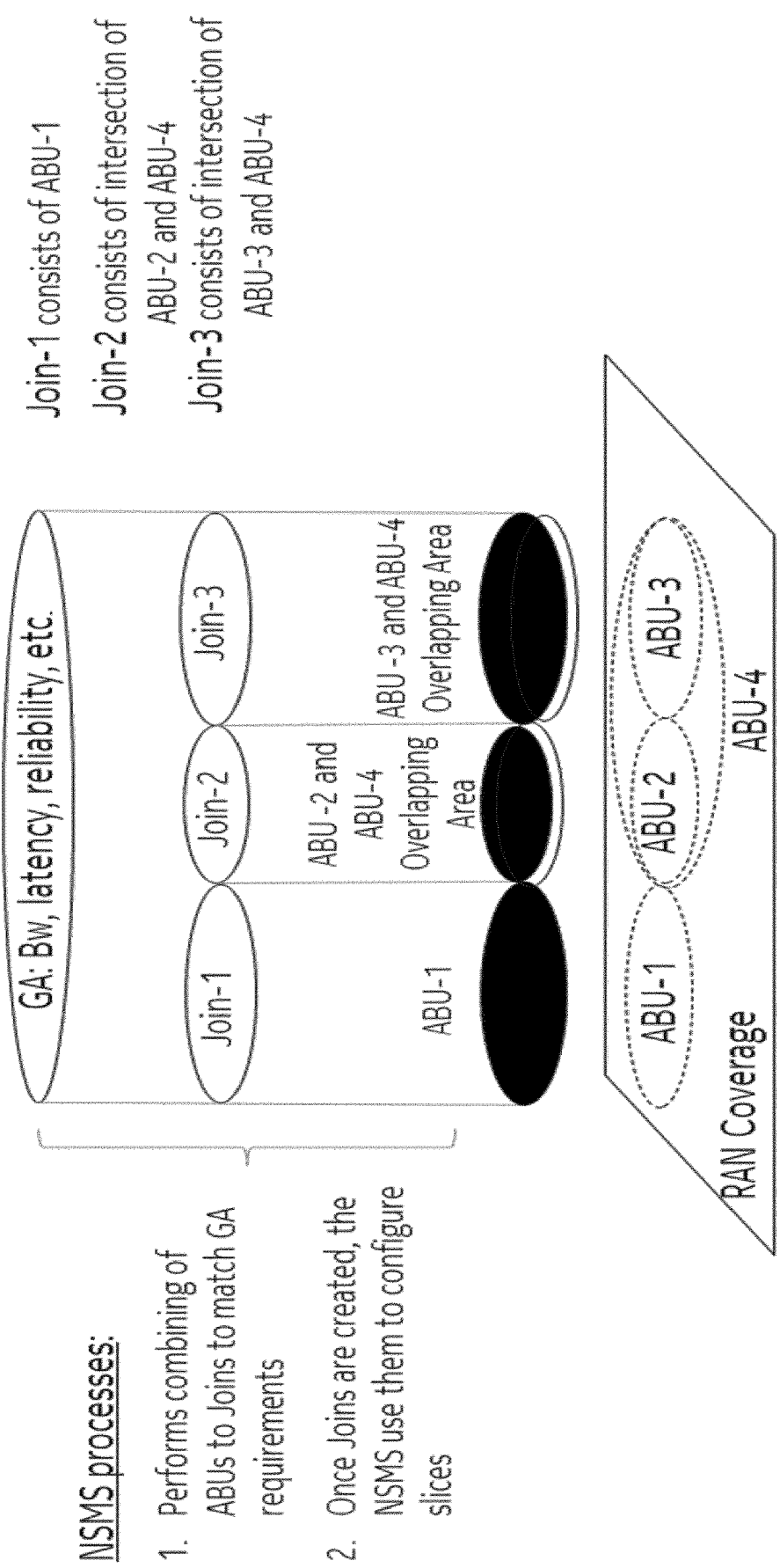
FIG. 15 shows a schematic diagram illustrating an example of combinations of area base units joins according to exemplary embodiments of the present invention.

FIG. 15 shows a schematic diagram illustrating an example of combinations of area base units joins according to exemplary embodiments of the present invention. In particular, FIG. 15 illustrates an example of an NSMS task of creating joins from (combinations of) ABUs.

In FIG. 15, Join-1 containing ABU-1, Join-2 containing the intersection of ABU-2 and ABU-4, and Join-3 containing the intersection of ABU-3 and ABU-4 at geographical area given again by GA are shown. The ABU repository at the management system, e.g. at the NSMS, keeps track of the different ABUs and relate them to certain RAT, radio features, performance capabilities, policy, and geographical coverage, user and/or service type considering joint radio features and policies (FIG. 12).

Figure 16:
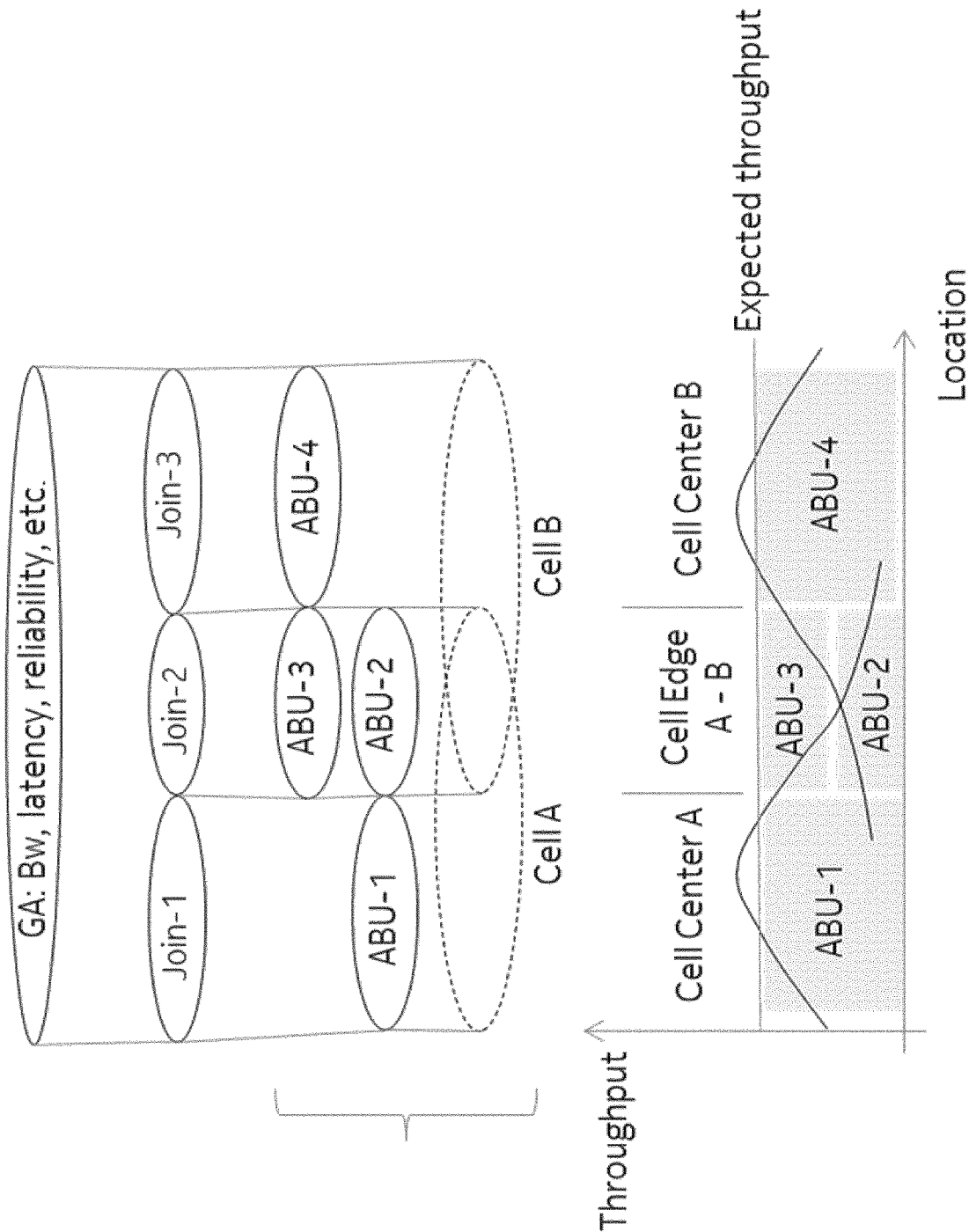
FIG. 16 shows a schematic diagram illustrating an example of combinations of area base units joins according to exemplary embodiments of the present invention.

In a second example, the principles of the invention are explained in a 3GPP LTE scenario with reference to FIG. 16.

FIG. 16 shows a schematic diagram illustrating an example of combinations of area base units joins according to exemplary embodiments of the present invention. In particular, FIG. 16 illustrates a two-cell example of aggregating different ABUs to achieve uniform performance across a ServiceProfile GA.

As can be seen in FIG. 16 considering two cells in an LTE environment, a uniform throughput performance for a ServiceProfile GA can be achieved by combing different ABUs. In this example, it is assumed that the performance of ABU-1 and ABU-4, respectively, in the center of the two cells can fulfil the desired ServiceProfile SLA, while at the cell edge the desired performance target can only be fulfilled via the use of Coordinated Multi-Point (CoMP), utilizing resources from both cells. FIG. 16 illustrates the mapping of ABUs to Joins, showing that the Join-2 combines ABU-2 and ABU-3 to achieve the expected performance. The bottom part of FIG. 16 shows that the expected throughput as a function of location can be achieved by combining ABU-2 and ABU-3, i.e., enabling CoMP to assure a uniform minimum performance at the cell edge area.

While exemplary embodiments of the present invention are described in relation to the radio network domain, the principles of the present invention are applicable to other network domains (e.g., transport or core networks) as well.

The above-described procedures and functions may be implemented by respective functional elements, processors, or the like, as described below. In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 17:
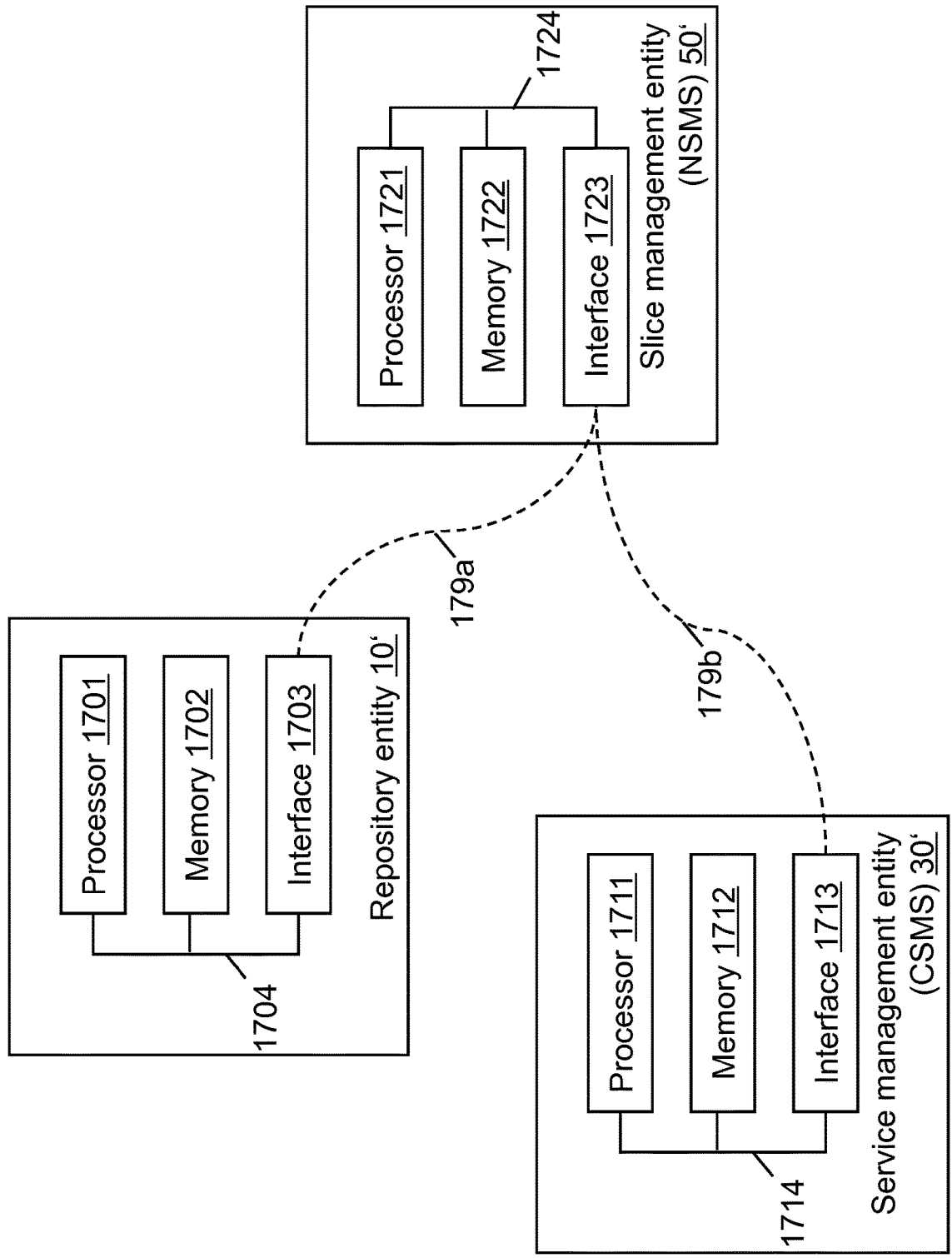
FIG. 17 is a block diagram alternatively illustrating apparatuses according to exemplary embodiments of the present invention.
Figure 18:
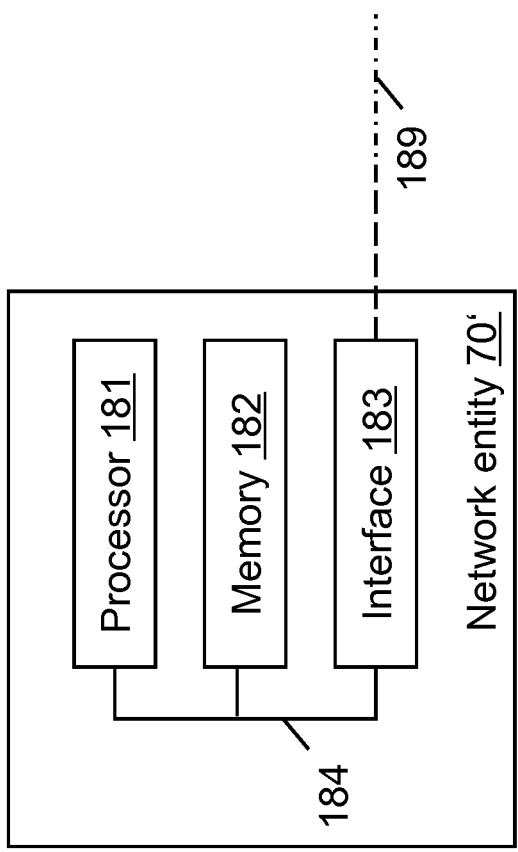
FIG. 18 is a block diagram alternatively illustrating an apparatus according to exemplary embodiments of the present invention.

In FIGS. 17 and 18, an alternative illustration of apparatuses according to exemplary embodiments of the present invention is depicted. As indicated in FIGS. 17 and 18, according to exemplary embodiments of the present invention, the apparatus (repository entity) 10' (corresponding to the repository entity 10) comprises a processor 1701, a memory 1702 and an interface 1703, which are connected by a bus 1704 or the like. Further, according to exemplary embodiments of the present invention, the apparatus (service management entity) 30' (corresponding to the service management entity 30) comprises a processor 1711, a memory 1712 and an interface 1713, which are connected by a bus 1714 or the like. Further, according to exemplary embodiments of the present invention, the apparatus (slice management entity) 50' (corresponding to the slice management entity 50) comprises a processor 1721, a memory 1722 and an interface 1723, which are connected by a bus 1724 or the like, and the apparatuses may be connected via link 179a, 179b, respectively.

Further, according to exemplary embodiments of the present invention, the apparatus (network entity) 70' (corresponding to the network entity 70 potentially embodying the repository entity 10, the service management entity 30, and/or the slice management entity 50) comprises a processor 181, a memory 182 and an interface 183, which are connected by a bus 184 or the like, and the apparatus may be connected with other apparatuses via link 189.

The processor 1701/1711/1721/181 and/or the interface 1703/1713/1723/183 may also include a modem or the like to facilitate communication over a (hardwire or wireless) link, respectively. The interface 1703/1713/1723/183 may include a suitable transceiver coupled to one or more antennas or communication means for (hardwire or wireless) communications with the linked or connected device(s), respectively. The interface 1703/1713/1723/183 is generally configured to communicate with at least one other apparatus, i.e. the interface thereof.

The memory 1702/1712/1722/182 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the repository entity 10 comprises at least one processor 1701, at least one memory 1702 including computer program code, and at least one interface 1703 configured for communication with at least another apparatus. The processor (i.e. the at least one processor 1701, with the at least one memory 1702 and the computer program code) is configured to perform generating a plurality of area base units, each area base unit being defined by a geographical zone corresponding to said area base unit, a network access technology of resources of said area base unit, and network capabilities and network features provided by said resources of said area base unit, wherein said network capabilities provided by said resources of said area base unit are the same over said geographical zone corresponding to said area base unit and said network features provided by said resources of said area base unit are uniform over said geographical zone corresponding to said area base unit (thus the apparatus comprising corresponding means for generating), and to perform storing said plurality of area base units (thus the apparatus comprising corresponding means for storing).

According to exemplary embodiments of the present invention, an apparatus representing the service management entity 30 comprises at least one processor 1711, at least one memory 1712 including computer program code, and at least one interface 1713 configured for communication with at least another apparatus. The processor (i.e. the at least one processor 1711, with the at least one memory 1712 and the computer program code) is configured to perform receiving a network slice request including network slice service requirements and a slice geographical area corresponding to a network slice according to said network slice request (thus the apparatus comprising corresponding means for receiving), and to perform deriving, based on said network slice service requirements, demand network capabilities and demand network features uniformly needed over said slice geographical area to fulfill said network slice service requirements (thus the apparatus comprising corresponding means for deriving).

According to exemplary embodiments of the present invention, an apparatus representing the slice management entity 50 comprises at least one processor 1721, at least one memory 1722 including computer program code, and at least one interface 1723 configured for communication with at least another apparatus. The processor (i.e. the at least one processor 1721, with the at least one memory 1722 and the computer program code) is configured to perform receiving a network resource combination request including information on demand network capabilities and demand network features over a slice geographical area (thus the apparatus comprising corresponding means for receiving), to perform transmitting, to an area base units repository, a request for at least one area base unit fulfilling at least one predetermined criterion in relation to said network resource combination request (thus the apparatus comprising corresponding means for transmitting), to perform receiving, from said area base units repository, area base units fulfilling said at least one predetermined criterion out of stored area base units, to perform generating at least one area base units join, wherein each of said at least one area base units join includes a combination of at least one area base unit of said area base units, for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and for each of said at least one area base units join, said combined network capabilities and network features of said combination of said at least one area base unit meet said demand network capabilities and demand network features over said join geographical area corresponding to said area base units join (thus the apparatus comprising corresponding means for generating), to perform selecting at least one selected area base units join of said at least one area base units join such that a combination of join geographical areas of said at least one selected area base units join covers said slice geographical area (thus the apparatus comprising corresponding means for selecting), and to perform combining said at least one selected area base units join as a network resource combination (thus the apparatus comprising corresponding means for combining).

According to exemplary embodiments of the present invention, an apparatus representing the network entity 70 comprises at least one processor 181, at least one memory 182 including computer program code, and at least one interface 183 configured for communication with at least another apparatus. The processor (i.e. the at least one processor 181, with the at least one memory 182 and the computer program code) is configured to perform any of the functionalities discussed above in relation to the apparatus representing the repository entity 10, the apparatus representing the service management entity 30, and/or the apparatus representing the slice management entity 50.

For further details regarding the operability/functionality of the individual apparatuses, reference is made to the above description in connection with any one of FIGS. 1 to 16, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for realization of service level agreements in network slice scenarios joining multiple network capabilities. Such measures exemplarily comprise, as a slice management entity, receiving a network resource combination request including information on demand network capabilities and demand network features over a slice geographical area, transmitting, to an area base units repository, a request for at least one area base unit fulfilling at least one predetermined criterion in relation to said network resource combination request, receiving, from said area base units repository, area base units fulfilling said at least one predetermined criterion out of stored area base units, generating at least one area base units join (wherein each of said at least one area base units join includes a combination of at least one area base unit of said area base units, for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and for each of said at least one area base units join, said combined network capabilities and network features of said combination of said at least one area base unit meet said demand network capabilities and demand network features over said join geographical area corresponding to said area base units join), selecting at least one selected area base units join of said at least one area base units join such that a combination of join geographical areas of said at least one selected area base units join covers said slice geographical area, and combining said at least one selected area base units join as a network resource combination.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
ABU area base unit
BTS base transceiver station
CN core network
CoMP Coordinated Multi-Point
CSMS Communication Service Management Service
eCITA enhanced Cell Id and Timing Advance
GA Geographical Area
GAD Geographical Area Description
GSM Global System for Mobile Communications
GSMA GSM Association
IOC Information Object Class
mmWave millimeter wave
NEST Network Slice Template
NRM Network Resource Model
NSMS Network Slice Management Service
PLMN Public Land Mobile Network
RA Registration Area
RAN Radio Access Network
RAT Radio Access Technology
SLA service-level agreement
SMLC Serving Mobile Location Service
S-NSSAI Single Network Slice Selection Assistance Information
TA Tracking Area
TMF TeleManagement Forum
TS Technical Specification
UMTS Universal Mobile Telecommunications System

The invention claimed is:

1. A method of a slice management entity, the method comprising:
    receiving a network resource combination request including information on demand network capabilities and demand network features over a slice geographical area;
    transmitting, to an area base units repository, a request for at least one area base unit fulfilling at least one predetermined criterion in relation to said network resource combination request;
    receiving, from said area base units repository, area base units fulfilling said at least one predetermined criterion out of stored area base units;
    generating at least one area base units join;
    wherein:
        each of said at least one area base units join includes a combination of at least one area base unit of said area base units,
        for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and
        for each of said at least one area base units join, said combined network capabilities and network features of said combination of said at least one area base unit meet said demand network capabilities and demand network features over said join geographical area corresponding to said area base units join,
    the method further comprising:
    selecting at least one selected area base units join of said at least one area base units join such that a combination of join geographical areas of said at least one selected area base units join covers said slice geographical area;
    combining said at least one selected area base units join as a network resource combination; and
    providing said network resource combination in response to said network resource combination request.

2. The method according to claim 1, wherein said at least one area base units join includes a combination of at least one area base unit providing resources of a first network access technology and at least one area base unit providing resources of a second network access technology.

3. The method according to claim 1, wherein said combined network capabilities and network features include at least one of uplink bandwidth, downlink bandwidth, latency, resiliency, reliability, stationary user support, nomadic user support, coordinated multi-point, carrier aggregation, hybrid access, bearer splitting, offloading policies, and charging rules.

4. The method according to claim 1, wherein each stored area base unit being defined by a geographical zone corresponding to said stored area base unit, a network access technology of resources of said stored area base unit, and network capabilities and network features provided by said resources of said stored area base unit, wherein said network capabilities provided by said resources of said stored area base unit are the same over said geographical zone corresponding to said stored area base unit and said network features provided by said resources of said stored area base unit are uniform over said geographical zone corresponding to said stored area base unit.

5. The method according to claim 4, wherein said at least one predetermined criterion is at least one of said geographical zone, said network access technology, and said network capabilities and network features.

6. An apparatus of a slice management entity, comprising:
  at least one processor; and
  at least one memory including computer program code;
    the at least one memory and the computer program code configured to, with the at least one processor, cause the apparatus at least to perform:
    receiving a network resource combination request including information on demand network capabilities and demand network features over a slice geographical area;
    transmitting, to an area base units repository, a request for at least one area base unit fulfilling at least one predetermined criterion in relation to said network resource combination request;
    receiving, from said area base units repository, area base units fulfilling said at least one predetermined criterion out of stored area base units;
    generating at least one area base units join;
    wherein:
      each of said at least one area base units join includes a combination of at least one area base unit of said area base units,
      for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and
      for each of said at least one area base units join, said combined network capabilities and network features of said combination of said at least one area base unit meet said demand network capabilities and demand network features over said join geographical area corresponding to said area base units join, and
    wherein the at least one memory and the computer program code are further configured to, with the at least one processor, cause the apparatus at least to perform:
    selecting at least one selected area base units join of said at least one area base units join such that a combination of join geographical areas of said at least one selected area base units join covers said slice geographical area;
    combining said at least one selected area base units join as a network resource combination; and
    providing said network resource combination in response to said network resource combination request.

7. The apparatus according to claim 6, wherein said at least one area base units join includes a combination of at least one area base unit providing resources of a first network access technology and at least one area base unit providing resources of a second network access technology.

8. The apparatus according to claim 6, wherein said combined network capabilities and network features include at least one of uplink bandwidth, downlink bandwidth, latency, resiliency, reliability, stationary user support, nomadic user support, coordinated multi-point, carrier aggregation, hybrid access, bearer splitting, offloading policies, and charging rules.

9. The apparatus according to claim 6, wherein each stored area base unit being defined by a geographical zone corresponding to said stored area base unit, a network access technology of resources of said stored area base unit, and network capabilities and network features provided by said resources of said stored area base unit, wherein said network capabilities provided by said resources of said stored area base unit are the same over said geographical zone corresponding to said stored area base unit and said network features provided by said resources of said stored area base unit are uniform over said geographical zone corresponding to said stored area base unit.

10. The apparatus according to claim 9, wherein said at least one predetermined criterion is at least one of said geographical zone, said network access technology, and said network capabilities and network features.

11. A non-transitory computer-readable medium comprising computer executable instructions that, when executed by a processor, cause the processor to perform the following operations:
  receiving a network resource combination request including information on demand network capabilities and demand network features over a slice geographical area;
  transmitting, to an area base units repository, a request for at least one area base unit fulfilling at least one predetermined criterion in relation to said network resource combination request;
  receiving, from said area base units repository, area base units fulfilling said at least one predetermined criterion out of stored area base units;
  generating at least one area base units join;
  wherein:
    each of said at least one area base units join includes a combination of at least one area base unit of said area base units,
    for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and
    for each of said at least one area base units join, said combined network capabilities and network features of said combination of said at least one area base unit meet said demand network capabilities and demand network features over said join geographical area corresponding to said area base units join, the method further comprising:
selecting at least one selected area base units join of said at least one area base units join such that a combination of join geographical areas of said at least one selected area base units join covers said slice geographical area;
combining said at least one selected area base units join as a network resource combination; and
providing said network resource combination in response to said network resource combination request.

12. The non-transitory computer-readable medium according to claim 11, wherein said at least one area base units join includes a combination of at least one area base unit providing resources of a first network access technology and at least one area base unit providing resources of a second network access technology.

13. The non-transitory computer-readable medium according to claim 11, wherein said combined network capabilities and network features include at least one of uplink bandwidth, downlink bandwidth, latency, resiliency, reliability, stationary user support, nomadic user support, coordinated multi-point, carrier aggregation, hybrid access, bearer splitting, offloading policies, and charging rules.

14. The non-transitory computer-readable medium according to claim 11, wherein each stored area base unit being defined by a geographical zone corresponding to said stored area base unit, a network access technology of resources of said stored area base unit, and network capabilities and network features provided by said resources of said stored area base unit, wherein said network capabilities provided by said resources of said stored area base unit are the same over said geographical zone corresponding to said stored area base unit and said network features provided by said resources of said stored area base unit are uniform over said geographical zone corresponding to said stored area base unit.

15. The non-transitory computer-readable medium according to claim 14, wherein said at least one predetermined criterion is at least one of said geographical zone, said network access technology, and said network capabilities and network features.

16. A system comprising:
a slice management service apparatus comprising:
at least one processor; and
at least one memory including computer program code;
the at least one memory and the computer program code configured to, with the at least one processor, cause the apparatus at least to perform:
receiving a network resource combination request including information on demand network capabilities and demand network features over a slice geographical area;
transmitting, to an area base units repository, a request for at least one area base unit fulfilling at least one predetermined criterion in relation to said network resource combination request;
receiving, from said area base units repository, area base units fulfilling said at least one predetermined criterion out of stored area base units;
generating at least one area base units join;

wherein:
each of said at least one area base units join includes a combination of at least one area base unit of said area base units,
for each of said at least one area base units join, combined network capabilities of said combination of said at least one area base unit are the same over a join geographical area corresponding to said area base units join and combined network features of said combination of said at least one area base unit are uniform over said join geographical area corresponding to said area base units join, and
for each of said at least one area base units join, said combined network capabilities and network features of said combination of said at least one area base unit meet said demand network capabilities and demand network features over said join geographical area corresponding to said area base units join, and
wherein the at least one memory and the computer program code are further configured to, with the at least one processor, cause the apparatus at least to perform:
selecting at least one selected area base units join of said at least one area base units join such that a combination of join geographical areas of said at least one selected area base units join covers said slice geographical area;
combining said at least one selected area base units join as a network resource combination; and
providing said network resource combination in response to said network resource combination request.

17. The system according to claim 16, wherein said at least one area base units join includes a combination of at least one area base unit providing resources of a first network access technology and at least one area base unit providing resources of a second network access technology.

18. The system according to claim 16, wherein said combined network capabilities and network features include at least one of uplink bandwidth, downlink bandwidth, latency, resiliency, reliability, stationary user support, nomadic user support, coordinated multi-point, carrier aggregation, hybrid access, bearer splitting, offloading policies, and charging rules.

19. The system according to claim 16, wherein each stored area base unit being defined by a geographical zone corresponding to said stored area base unit, a network access technology of resources of said stored area base unit, and network capabilities and network features provided by said resources of said stored area base unit, wherein said network capabilities provided by said resources of said stored area base unit are the same over said geographical zone corresponding to said stored area base unit and said network features provided by said resources of said stored area base unit are uniform over said geographical zone corresponding to said stored area base unit.

20. The system according to claim 19, wherein said at least one predetermined criterion is at least one of said geographical zone, said network access technology, and said network capabilities and network features.

* * * * *